(12) United States Patent
Hirano et al.

(10) Patent No.: US 7,536,108 B2
(45) Date of Patent: May 19, 2009

(54) HIGH PRECISION CHROMATIC DISPERSION MEASURING METHOD AND AUTOMATIC DISPERSION COMPENSATING OPTICAL LINK SYSTEM THAT USES THIS METHOD

(75) Inventors: Akira Hirano, Yokohama (JP); Yutaka Miyamoto, Yokohama (JP); Masahito Tomizawa, Yokosuka (JP); Shoichiro Kuwahara, Yokosuka (JP); Hiroshi Takahashi, Atsugi (JP); Yasuyuki Inoue, Isehara (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 655 days.

(21) Appl. No.: 10/185,486

(22) Filed: Jun. 26, 2002

(65) Prior Publication Data

US 2003/0002112 A1    Jan. 2, 2003

(30) Foreign Application Priority Data

Jun. 29, 2001   (JP)   ............................. 2001-198137
Jun. 6, 2002    (JP)   ............................. 2002-165383

(51) Int. Cl.
*H04B 10/12* (2006.01)
(52) U.S. Cl. ...................... 398/147; 398/148; 398/158
(58) Field of Classification Search ............... 356/73.1; 398/188, 65, 29, 81, 158, 159, 193, 136, 398/147, 148
See application file for complete search history.

(56) References Cited

U.S. PATENT DOCUMENTS 5,227,908 A    7/1993   Henmi
5,406,368 A *  4/1995   Horiuchi et al. ............ 356/73.1
5,497,260 A    3/1996   Jurek
5,522,004 A    5/1996   Djupsjobacka
5,717,510 A *  2/1998   Ishikawa et al. ............ 398/199
6,055,082 A *  4/2000   Chikuma ..................... 398/31

(Continued)

FOREIGN PATENT DOCUMENTS

EP        0 539 177 A2     4/1993

(Continued)

OTHER PUBLICATIONS

Dimmick, Timothy, E., et al. "Optical Dispersion Monitoring Technique Using Double Sideband Subcarriers." IEEE Photonics Technology Letters. vol. 12, No. 7. Jul. 2000.*

(Continued)

*Primary Examiner*—Dzung D Tran
(74) *Attorney, Agent, or Firm*—Darby & Darby PC

(57) ABSTRACT

The present invention relates to an automatic dispersion compensating optical link system. Carrier suppressed RZ encoded optical signals generated using carrier suppressing means and binary NRZ code or partial response code, or carrier suppressed clock signals generated using carrier suppressing means and clock signals are transmitted on an optical transmission line. Two bands of the carrier suppressed RZ encoded optical signals or carrier suppressed clock signals transmitted on the optical transmission line are each divided into bands and are received. Phase information of the respective basebands is extracted from the binary NRZ code components or partial response code components or clock signals in each band and the relative phase difference thereof is detected. The chromatic dispersion value of the optical transmission line is then calculated from the relative phase difference.

39 Claims, 25 Drawing Sheets

FIRST STRUCTURAL EXAMPLE
OF THE OPTICAL RECEIVING APPARATUS 2

U.S. PATENT DOCUMENTS

| | | | |
|---|---|---|---|
| 6,137,604 A | 10/2000 | Bergano | |
| 6,362,874 B1 * | 3/2002 | Madsen | 356/73.1 |
| 6,411,416 B1 | 6/2002 | Ooi et al. | |
| 6,552,837 B2 * | 4/2003 | Mirshekar-Syahkal et al. | 359/245 |
| 6,573,985 B2 * | 6/2003 | Ibukuro et al. | 356/73.1 |
| 6,614,511 B1 * | 9/2003 | Sakairi et al. | 356/73.1 |
| 6,671,464 B1 * | 12/2003 | Kikuchi | 398/65 |
| 6,882,802 B2 * | 4/2005 | Ohhira | 398/188 |
| 2002/0030878 A1 * | 3/2002 | Ohhiro | 359/183 |

FOREIGN PATENT DOCUMENTS

| | | |
|---|---|---|
| JP | 05-003456 A1 | 1/1993 |
| JP | 06-053906 A1 | 2/1994 |
| JP | 08-154075 A1 | 6/1996 |
| JP | 10-257037 A1 | 9/1998 |
| JP | 11-068657 A1 | 3/1999 |
| JP | 11-205240 A1 | 7/1999 |
| JP | 2000-236298 A1 | 8/2000 |
| JP | 2002-055025 A1 | 2/2002 |
| WO | WO-99/45420 A1 | 9/1999 |

OTHER PUBLICATIONS

Miyamoto, Y., et al. "Duobinary carrier-suppressed return-to-zero format and its application to 100GHz-spaced 8 ×43-Gbit/s DWDM unrepeatered transmission over 163 km", Optical Fiber Communication Conference (OFC). Technical Digest Postconference Edition. Anaheim, CA, Mar. 17-22, 2001, Trends in Optics and Photonics Series. vol. 54.

G. Ishikawa et al., "Demonstration of automatic dispersion equalization in 40 Gbit/s OTDM transmission", Technical Digest of European Conference on Optical Communication, pp. 519-520, Sep. 1998.

Y. Miyamoto et al., "Duobinary carrier-suppressed return-to-zero format and its application to 100 GHz-spaced 8×43-Gbit/s DWDM unrepeatered transmission over 163 km", Optical Fiber Communication Conference and Exhibit 2001, OFC2001, vol. 2, 2001.

A. Hirano et al., "640 Gbit/s (16 channel ×42.7Gbit/s) WDM L-band DSF transmission experiment using 25nm bandwidth AWG dispersion slope compensator", Electronics Letters, vol. 36, No. 19, pp. 1638-1639, Sep. 2000.

M. Shirasaki et al., "Variable dispersion compensator using the virtually imaged phased array (VIPA) for 40-Gbit/s WDM transmission systems", ECOC2000 PDP, 2000.

M.M. Ohn et al., "Dispersion variable fibre Bragg grating using piezoelectric stack", Electronics Letters, vol. 32, No. 21, pp. 2000-2001, Oct. 1996.

Y. Miyamoto et al., 320 Gbit/s (8×40 Gbit/s) WDM transmission over 367-km zero-dispersion-flattened line with 120 km repeater spacing using carrier-suppressed return-to-zero pulse format:, Tech. Dig. OAA '99, PDP4m 1999.

T. Miyamoto et al., "Suppression of degradation induced by SPM/XPM + GVD in WDM transmission using a bit-synchronous intensity modulated DPSK signal", Tech. Dig. In OECC2000, paper 14D3-3, pp. 580-581, Jul. 2000.

* cited by examiner

FIRST STRUCTURAL EXAMPLE
OF THE OPTICAL TRANSMITTING APPARATUS 1

SECOND STRUCTURAL EXAMPLE
OF THE OPTICAL TRANSMITTING APPARATUS 1

DCS-RZ OPTICAL SIGNAL GENERATION PRINCIPLE
OPTICAL DUOBINARY SIGNALS

DCS-RZ OPTICAL SIGNAL GENERATION PRINCIPLE
GATE PHASE OF PUSH-PULL TYPE
MACH-ZEHNDER OPTICAL MODULATOR 12

DCS-RZ OPTICAL SIGNAL GENERATION PRINCIPLE
DCS-RZ OPTICAL SIGNALS

DCS-RZ OPTICAL SIGNAL GENERATION PRINCIPLE

FOURTH STRUCTURAL EXAMPLE
OF THE OPTICAL TRANSMITTING APPARATUS 1

FOURTH STRUCTURAL EXAMPLE
OF THE OPTICAL TRANSMITTING APPARATUS 1

FIRST STRUCTURAL EXAMPLE
OF THE OPTICAL RECEIVING APPARATUS 2

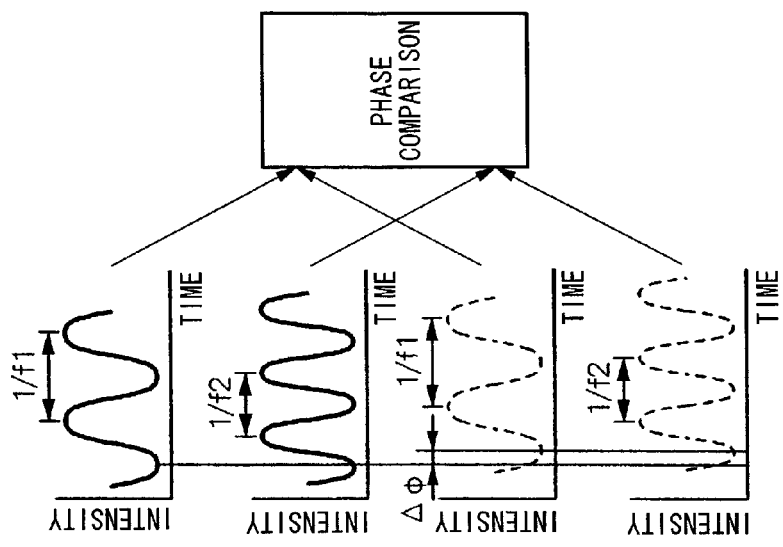

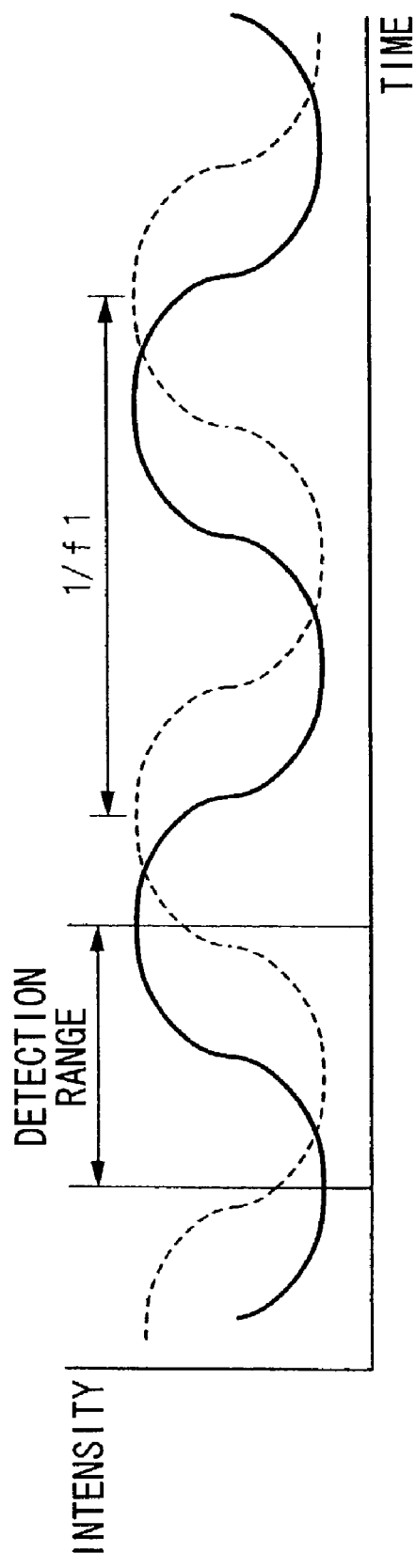
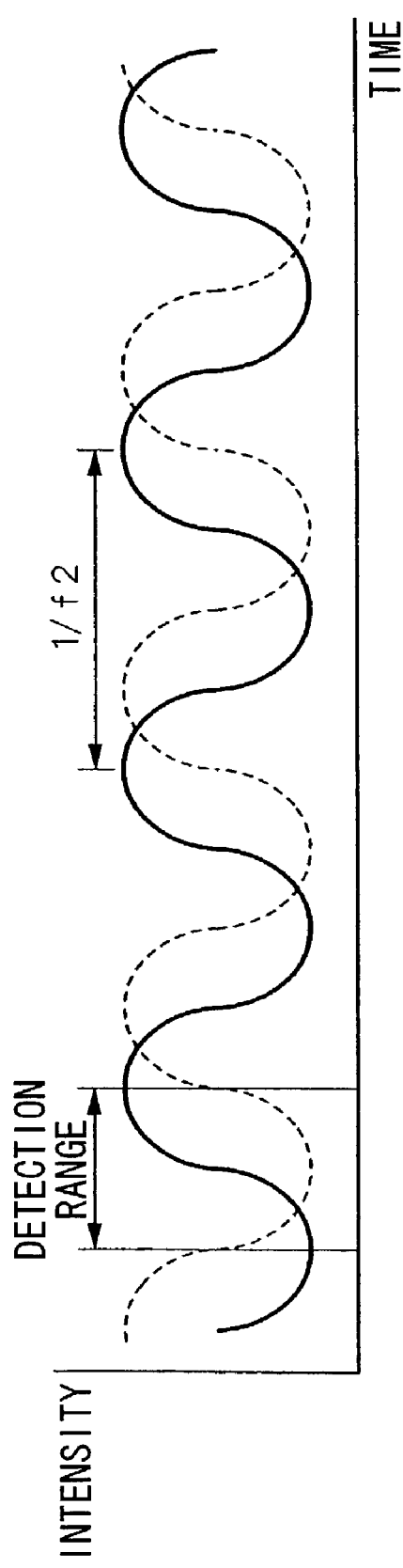

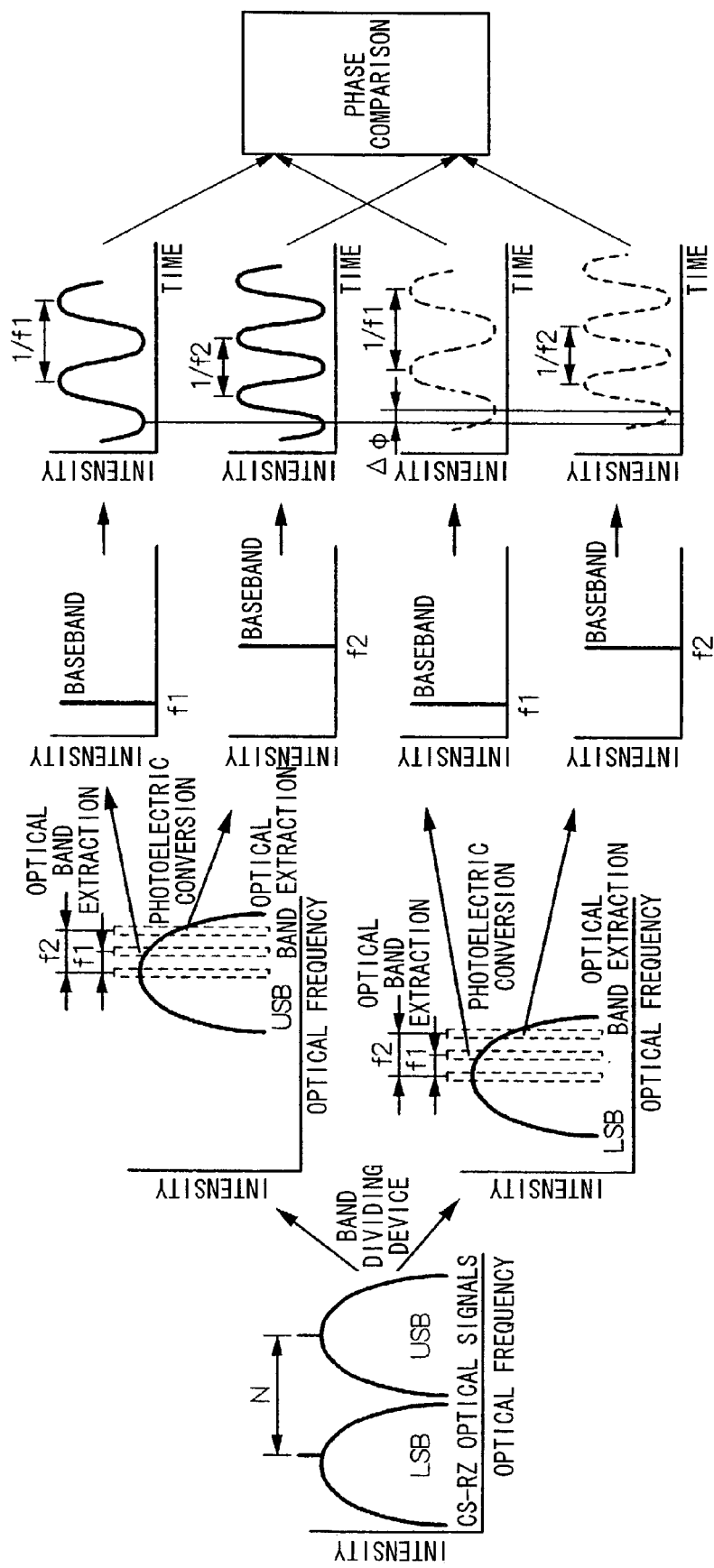

RELATIONSHIP BETWEEN OPTICAL CLOCK SIGNAL INTENSITY
AND CHROMATIC DISPERSION VALUE

RELATIONSHIP BETWEEN OPTICAL CLOCK SIGNAL INTENSITY
AND CHROMATIC DISPERSION VALUE us 7,536,108 B2

HIGH PRECISION CHROMATIC DISPERSION MEASURING METHOD AND AUTOMATIC DISPERSION COMPENSATING OPTICAL LINK SYSTEM THAT USES THIS METHOD

BACKGROUND OF THE INVENTION

1. Field of the Invention

The present invention relates to a high precision chromatic dispersion measuring method that precisely measures chromatic dispersion values of the optical transmission line in an optical link system that uses an optical transmission line having chromatic dispersion such as an optical fiber, and then calculates a compensation amount for the measured chromatic dispersion. Furthermore, the present invention relates to an automatic dispersion compensating optical link system that automatically compensates chromatic dispersion in the optical transmission line and also polarization mode dispersion by controlling a dispersion compensator based on a compensation amount calculated using the above method.

This application is based on Patent Application No. 2001-198137 filed in Japan, the content of which is incorporated herein by reference.

2. Description of the Related Art

In an optical link system that uses high-speed channels, degradation in the waveform is generated by the chromatic dispersion or higher order dispersion such as a dispersion slope of the optical fiber and the like forming the optical transmission line, and the degradation in the transmission quality which is created by the degradation is a problem. Specifically, the degradation is generated as a result of chromatic dispersion in the optical fiber or higher order dispersion thereof acting on the bandwidth of the optical signal causing the optical pulse waveform to breakdown, and allowing interference from adjacent optical pulses to be received. Moreover, because the chromatic dispersion of the optical fiber and the like also varies due to the ambient temperature, this also affects the stability of the transmission quality. Furthermore, a similar problem is also created when a chromatic dispersion is changed because of route switching when a fault such as a broken line occurs in a particular transmission section.

In order to solve these problems various chromatic dispersion measuring methods and automatic dispersion compensating optical link systems combined with dispersion compensation technologies have been proposed. One of these is a method in which the intensity of an optical clock signal extracted from received optical signals is monitored and the chromatic dispersion values are controlled such that the intensity is set either to the maximum or the minimum.

FIGS. 27A and 27B show the relationship between optical clock signal intensity and chromatic dispersion values for an 40 Gbit/s RZ signal generated using optical time division multiplexing (OTDM) and for a normal RZ signal with a duty ratio of 50% (cited document: G. Ishikawa and H. Ooi, "Demonstration of Automatic Dispersion Equalization in 40 Gbit/s OTDM Transmissions", Technical Digest of European Conference on Optical Communication, pp. 519-520, 1998).

Because the optical clock signal intensity in the 40 Gbit/s RZ signal generated using OTDM shown in FIG. 27A has a local minimum value at the point when the eye opening is at maximum, the chromatic dispersion values are controlled such that the optical clock signal intensity is a local minimum value. In contrast, in the case of the RZ signal with a duty ratio of 50% shown in FIG. 27B, the chromatic dispersion values are controlled such that the optical clock signal intensity shows the maximum value.

In the above described conventional method, a simple correlation is assumed between the optical clock signal intensity and the eye-opening, and makes use of the characteristic that when the optical clock signal intensity becomes a local minimum value in an OTDM signal, and when the optical clock signal intensity reaches maximum in an RZ signal, the chromatic dispersion amount of the optical signal is zero and the eye opening reaches the maximum.

However, this is only true in the case where the incident light power into the optical fiber is sufficiently small and phase modulation caused by non-linear optical effects can be negligible. In contrast, in an actual transmission system there is practically no way to carry out the transmission under the above conditions and it is not possible to disregard the influence of non-linear optical effects such as cross phase modulation in wavelength division multiplexing and four-wave mixing, and self phase modulation effects. Namely, in a transmission medium such as an optical fiber, self phase modulation is generated by the optical non-linearity of the transmission medium itself, and due to the interaction of this self phase modulation and of the chromatic dispersion it cannot be guaranteed that zero dispersion will be the optimum dispersion value. In such cases, there is no guarantee that the point where the local minimum (maximum) clock signal intensity and the eye opening is at maximum will match the point where the chromatic dispersion is at zero. Namely, in the conventional technology it is difficult to achieve a sufficient suppression in transmission quality degradation using chromatic dispersion compensation.

Moreover, as described above, because the optimum dispersion value is obtained when the optical clock signal intensity is at the local minimum value and at the maximum value for an OTDM signal and RZ signal, respectively, the control method differs greatly in accordance with the encoding format. Furthermore, although in an OTDM signal the optical clock signal intensity is at the local minimum value when the eye opening is at maximum, two local maximums exist in the vicinity of the local minimum value. Therefore, to keep the optical clock signal intensity automatically to the local minimum value is extremely difficult. Moreover, as the maximum of the optical clock signal intensity is 0.8 and the minimum thereof is 0.4, the dynamic range thereof is only 3 dB. Accordingly, it is also difficult to perform stable control from the viewpoint of the SN ratio as well.

Furthermore, in the conventional technology, when monitoring the optical clock signal intensity in accordance with the chromatic dispersion, the optical clock signal intensity changes in the same way regardless of whether the chromatic dispersion shifts to the positive side or to the negative side, and the direction of the shift of a chromatic dispersion value is unknown. Therefore, in order to determine that direction, it is necessary to intentionally generate degradation in the eye opening by shifting the chromatic dispersion value. Namely, because it is not possible to avoid the degradation in the transmission quality caused by the degradation in the eye opening, monitoring the optical clock signal intensity while transmission is being performed has been difficult.

SUMMARY OF THE INVENTION

It is therefore an object of the present invention to provide a high precision chromatic dispersion measuring method that precisely measures a chromatic dispersion value of an optical transmission line and then calculates a chromatic dispersion compensation amount to compensate for the chromatic dispersion value, without imparting any effect such as a short break of the main signal while the transmission is being performed.

It is a further object of the present invention to provide an automatic dispersion compensating optical link system that combines the above high precision chromatic dispersion measuring method with a dispersion compensator, and automatically compensates for chromatic dispersion and fluctuations thereof in an optical transmission line by controlling the dispersion compensator based on a calculated chromatic dispersion compensation amount, and thereby achieves an improvement in the stability and reliability of the optical link system.

According to the present invention, the above aims can be achieved by a high precision chromatic dispersion measuring method, comprising the steps of: an optical signal transmission step in which digital optical signals are transmitted on an optical transmission line; an optical signal receiving step in which the digital optical signals transmitted on the optical transmission line are separated into at least two band components and are received; and a chromatic dispersion value calculation step in which a chromatic dispersion value is calculated for the optical transmission line, based on information about a relative phase difference between the received band components.

According to the present invention, the above aims can also be achieved by a high precision chromatic dispersion measuring method, wherein the digital optical signals are carrier suppressed RZ encoded optical signals generated using carrier suppressing means and binary NRZ code or partial response code, or are carrier suppressed clock signals generated using carrier suppressing means and clock signals, wherein, in the optical signal receiving step, two bands of the carrier suppressed RZ encoded optical signals or of the carrier suppressed clock signals transmitted on the optical transmission line are each divided into bands and are received, and wherein, in the chromatic dispersion value calculation step, phase information on the respective basebands is extracted from binary NRZ code components or partial response code components or clock signals in each of the bands and a relative phase difference thereof is detected, and a chromatic dispersion value of the optical transmission line is calculated from the relative phase difference.

According to the present invention, the above aims can also be achieved by a high precision chromatic dispersion measuring method, wherein the digital optical signals are carrier suppressed RZ encoded optical signals generated using carrier suppressing means and binary NRZ code or partial response code, or are carrier suppressed clock signals generated using carrier suppressing means and clock signals, wherein, in the optical signal receiving step, both of the two bands and one of the two bands of the carrier suppressed RZ encoded optical signals or of the carrier suppressed clock signals transmitted on the optical transmission line are each divided into bands and are received, and wherein, in the chromatic dispersion value calculation step, phase information on the respective basebands is extracted from binary RZ or NRZ code components or partial response code components or clock signals in each of the bands and a relative phase difference thereof is detected, and a chromatic dispersion value of the optical transmission line is calculated from the relative phase difference.

According to the present invention, the above aims can also be achieved by a high precision chromatic dispersion measuring method, wherein the digital optical signals are carrier suppressed RZ encoded optical signals generated using carrier suppressing means and binary NRZ code or partial response code, or are carrier suppressed clock signals generated using carrier suppressing means and clock signals, wherein, in the optical signal receiving step, one of the two bands of the carrier suppressed RZ encoded optical signals or of the carrier suppressed clock signals transmitted on the optical transmission line is received, and wherein, in the chromatic dispersion value calculation step, phase information on the basebands of binary NRZ code components or partial response code components or clock signals in each of the bands is extracted, and a relative phase difference between the detected phase and a phase state measured for a reference dispersion value in advance is detected, and a chromatic dispersion value of the optical transmission line is calculated from the relative phase difference.

According to the present invention, the above aims can also be achieved by a high precision chromatic dispersion measuring method, wherein the digital optical signals are carrier suppressed RZ encoded optical signals generated using carrier suppressing means and binary NRZ code or partial response code, or are carrier suppressed clock signals generated using carrier suppressing means and clock signals, wherein, in the optical signal receiving step, both of the two bands and one of the two bands of the carrier suppressed RZ encoded optical signals or of the carrier suppressed clock signals transmitted on the optical transmission line is sequentially received with the division band switched, and wherein, in the chromatic dispersion value calculation step, phase information on the respective basebands is extracted from binary RZ or NRZ code components or partial response code components or clock signals in each of the bands and a relative phase difference thereof is detected, and a chromatic dispersion value of the optical transmission line is calculated from the relative phase difference.

According to the present invention, the above aims can also be achieved by a high precision chromatic dispersion measuring method, wherein the digital optical signals are NRZ encoded optical signals, RZ encoded optical signals or optical clock signals, wherein, in the optical signal receiving step, two vestigial side bands (VSB) of the NRZ encoded optical signals, the RZ encoded optical signals or the optical clock signals transmitted on the optical transmission line are each divided into bands and are received, and wherein, in the chromatic dispersion value calculation step, phase information of respective basebands is extracted from NRZ components or clock components in each band and a relative phase difference thereof is detected, and a chromatic dispersion value of the optical transmission line is calculated from the relative phase difference.

According to the present invention, the above aims can also be achieved by a high precision chromatic dispersion measuring method, wherein the digital optical signals are NRZ encoded optical signals, RZ encoded optical signals or optical clock signals, wherein, in the optical signal receiving step, both of the two VSB bands and one of the two VSB bands of the NRZ encoded optical signals, the RZ encoded optical signals or the optical clock signals transmitted on the optical transmission line are each divided into bands and are received, and wherein, in the chromatic dispersion value calculation step, phase information of respective basebands is extracted from NRZ components or clock components in each band and a relative phase difference thereof is detected, and a chromatic dispersion value of the optical transmission line is calculated from the relative phase difference.

According to the present invention, the above aims can also be achieved by a high precision chromatic dispersion measuring method, wherein the digital optical signals are NRZ encoded optical signals, RZ encoded optical signals or optical clock signals, wherein, in the optical signal receiving step, one of the two VSB bands of the NRZ encoded optical signals, the RZ encoded optical signals or the optical clock signals transmitted on the optical transmission line is received, and wherein, in the chromatic dispersion value calculation step, phase information of respective basebands is extracted from NRZ components or clock components in the band, and a relative phase difference between the phase information and a phase state measured for a reference dispersion value in advance is detected, and a chromatic dispersion value of the optical transmission line is calculated from the relative phase difference.

According to the present invention, the above aims can also be achieved by a high precision chromatic dispersion measuring method, wherein the digital optical signals are NRZ encoded optical signals, RZ encoded optical signals or optical clock signals, wherein, in the optical signal receiving step, both of the two VSB bands and one of the two VSB bands of the NRZ encoded optical signals, the RZ encoded optical signals or the optical clock signals transmitted on the optical transmission line is sequentially received with the division band switched, and wherein, in the chromatic dispersion value calculation step, phase information of respective basebands is extracted from NRZ components or clock components in each band and a relative phase difference thereof is detected, and a chromatic dispersion value of the optical transmission line is calculated from the relative phase difference.

According to the present invention, the above aims can also be achieved by an automatic dispersion compensating optical link system comprising a device which calculates a chromatic dispersion value for an optical transmission line using any of the high precision chromatic dispersion measuring methods described above that is provided on an optical transmitting apparatus and an optical receiving apparatus connected via an optical transmission line.

According to the present invention, the above aims can also be achieved by an automatic dispersion compensating optical link system, wherein the automatic dispersion compensating optical link system being further provided with a dispersion compensating device which performs dispersion compensation in any of the optical transmitting apparatus, the optical receiving apparatus, and the optical transmission line based on a chromatic dispersion value for the optical transmission line calculated by the device for calculating the chromatic dispersion value.

According to the present invention, the above aims can also be achieved by an automatic dispersion compensating optical link system, wherein the optical transmitting apparatus and the optical receiving apparatus are respectively formed by wavelength-division multiplexing transmitting apparatus and wavelength-division multiplexing receiving apparatus, and wherein the device for calculating the chromatic dispersion value calculates the chromatic dispersion value of at least one wavelength channel.

According to the present invention, the above aims can also be achieved by an automatic dispersion compensating optical link system, wherein the automatic dispersion compensating optical link system is further provided with a dispersion compensating device that performs dispersion compensation based on a calculated chromatic dispersion value for the optical transmission line.

According to the present invention, the above aims can also be achieved by an automatic dispersion compensating optical link system, wherein the optical transmitting apparatus generates carrier suppressed RZ encoded signals generated using carrier suppressed clock generation device and binary NRZ code or partial response encoding device, and transmits the generated signals on the optical transmission line, and wherein the optical receiving apparatus comprises: a chromatic dispersion compensating device that performs chromatic dispersion compensation by changing a chromatic dispersion amount; a band dividing device that divides each of two bands of the carrier suppressed RZ encoded optical signal; a photoelectric conversion device that converts optical signals of each of the divided bands into electrical signals; a band extracting device that extracts a band having an arbitrary center frequency from baseband signals output from the photoelectric conversion device; and a phase comparing device that extracts and compares phase information of bands having the same center baseband frequencies extracted from the optical signals of the respective bands.

According to the present invention, the above aims can also be achieved by an automatic dispersion compensating optical link system, wherein the optical transmitting apparatus generates carrier suppressed RZ encoded optical signals generated using carrier suppressed clock generation device and binary NRZ code or partial response encoding device, and transmits the generated signals on the optical transmission line, and wherein the optical receiving apparatus comprises: a chromatic dispersion compensating device that performs chromatic dispersion compensation by changing a chromatic dispersion amount; a band dividing device that divides each of two bands of the carrier suppressed RZ encoded optical signal; an optical band extracting device that extracts an optical band having an arbitrary center frequency from the respective divided bands; a photoelectric conversion device that converts optical bands extracted from the respective bands into electrical signals; and a phase comparing device that extracts and compares phase information from baseband signals extracted from the photoelectric conversion device.

According to the present invention, the above aims can also be achieved by an optical receiving apparatus, comprising: a device which separates out and extracts two different frequency components from among optical spectrum components of the received digital optical signals; a phase comparing device which detects a relative phase difference between the extracted frequency components; a chromatic dispersion measuring device which calculates a chromatic dispersion amount of the digital optical signals due to the optical transmission line based on relative phase difference information obtained from the phase comparing device; and a dispersion compensating device which compensates chromatic dispersion of the optical transmission line based on a measurement result of the chromatic dispersion measuring device.

In addition, it is possible to measure a chromatic dispersion value of an optical transmission line while the optical transmission line is actually being used without the transmission of the main signal being affected. Moreover, in the method and system of the present invention, there is provided sufficient detection sensitivity and precision compared with the dispersion tolerance in the bit rate of the main signal, and it is possible to detect and compensate against deteriorations in transmission quality caused by the effects of chromatic dispersion.

Furthermore, in the present invention, when tone signals are used, because it is possible to alter the detection sensitivity and precision flexibly, the present invention is able to deal with large shifts in the chromatic dispersion value that occur when a route is switched because of a fault in the optical transmission line, and it is possible to immediately detect an appropriate dispersion compensation amount and compensate the chromatic dispersion.

As a result, it is possible to achieve an improvement in the operating stability and reliability of an optical link system. Moreover, it is possible to detect degradation in transmission quality caused by chromatic dispersion independently from degradation in transmission quality caused by polarization mode dispersion, and to automatically compensate for these. This enables an improvement to be achieved in the reliability of the optical transmission system, and a simplification of the maintenance operation to be achieved.

BRIEF DESCRIPTION OF THE DRAWINGS

FIGS. 24A to 24E are diagrams for explaining the operation of the first structural example of the automatic dispersion compensating optical link system of the third embodiment.

FIGS. 25A and 25B are diagrams for explaining a repetitive frequency and phase difference detection range.

FIGS. 26A to 26E are diagrams for explaining the operation of the first structural example of the automatic dispersion compensating optical link system of the fourth embodiment.

DETAILED DESCRIPTION OF THE PREFERRED EMBODIMENTS

Figure 1:
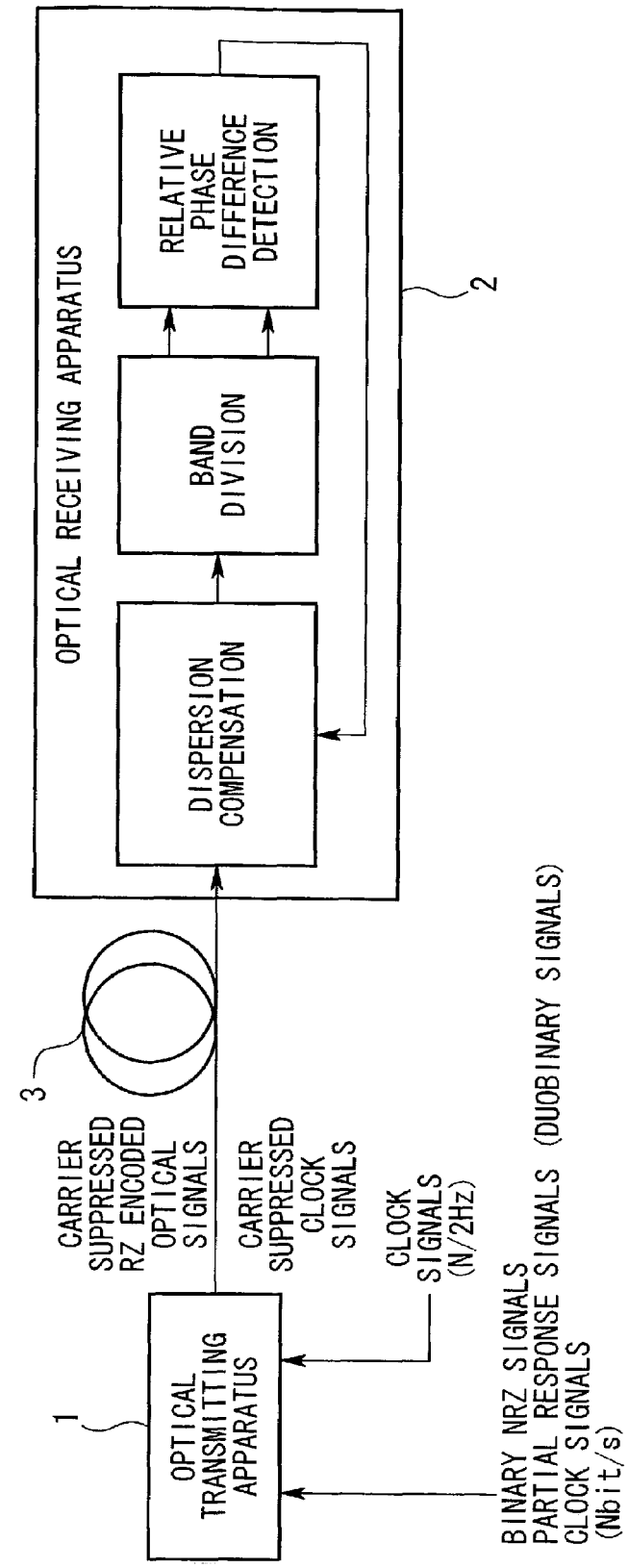
FIG. 1 is a block diagram showing the basic structure of the automatic dispersion compensating optical link system of the present invention.

FIG. 1 shows the basic structure of the automatic dispersion compensating optical link system of the present invention.

In FIG. 1, the automatic dispersion compensating optical link system of the present embodiment is provided with an optical transmitting apparatus 1 and an optical receiving apparatus 2. The optical transmitting apparatus 1 transmits a carrier suppressed RZ encoded optical signal generated using carrier suppressing means and binary NRZ code or partial response code, or transmits a carrier suppressed clock signal generated using carrier suppressing means and clock signals. The optical receiving apparatus 2 divides into bands and receives a carrier suppressed RZ encoded optical signal or a carrier suppressed clock signal transmitted via an optical transmission line 3, extracts a binary NRZ signal or partial response signal components or clock signals, and performs dispersion compensation based on chromatic dispersion values calculated from the phase information thereof.

It is also possible for an optical amplifier to be disposed at either the transmission end or the receiving end of the optical transmission line 3 or else partway between the two so that sufficient optical power is obtained to ensure a sufficient SN ratio in the optical receiving apparatus 2.

Hereinbelow, a basic example is described in which a carrier suppressed RZ encoded optical signal (referred to below as a DCS-RZ optical signal) generated from a duobinary signal is transmitted as partial response code, while at the receiving side a DCS-RZ optical signal is divided into bands and is received, and a relative phase difference in the baseband thereof is detected. However, the same description applies when binary NRZ code, multilevel partial response code, or clock signals are used. A detailed description of DCS-RZ optical signals is given in "Duobinary Carrier-Suppressed Return-to-Zero Format and its Application to 100 GHz-spaced 8×43-Gbit/s DWDM Unrepeatered Transmission over 163 km", Miyamoto Y. et al., Optical Fiber Communication Conference and Exhibition 2001, OFC 2001, Vol. 2, 2001.

Next, a description will be given of the automatic dispersion compensating optical link system of the first embodiment.

Figure 2:
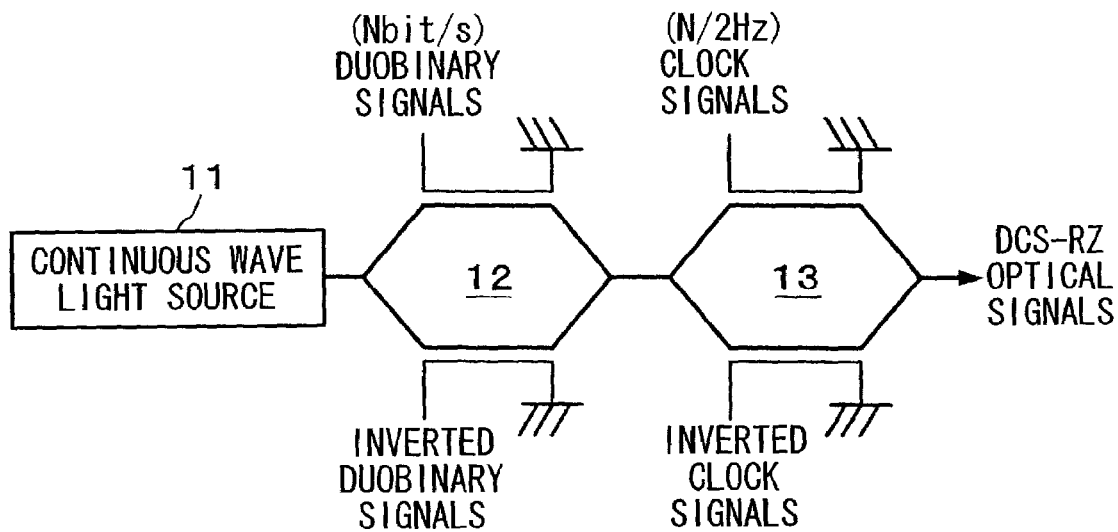
FIG. 2 is a block diagram showing a first structural example of the optical transmitting apparatus 1 of the first embodiment.

First Structural Example of the Optical Transmitting Apparatus 1 of the First Embodiment FIG. 2 shows a first structural example of the optical transmitting apparatus 1. In FIG. 2, the optical transmitting apparatus 1 is formed by a continuous wave light source that outputs continuous wave light, a push-pull type Mach-Zehnder optical modulator 12 that generates optical duobinary signals by performing intensity modulation and phase modulation on continuous wave light using duobinary signals, and a push-pull type Mach-Zehnder optical modulator 13 that performs RZ encoding on optical duobinary signals by alternating phase differences using clock signals to the optical duobinary signals so as to convert them to DCS-RZ optical signals.

The continuous wave light source 11 uses, for example, a DFB laser. The push-pull type Mach-Zehnder optical modulators 12 and 13 are Mach-Zehnder interferometer types optical intensity modulators formed on a lithium niobate (LN) substrate or a semiconductor substrate. On the two arms of each are provided electrodes for the respective modulations, and by driving both complementarily it is possible to perform chirp free modulation. Note that if an X-cut structure is employed here it is possible to achieve chirp free modulation using only one electrode.

The operation of the optical transmitting apparatus 1 will now be described. Three-level duobinary signals converted from binary signals are input complementarily into each electrode of the push-pull type Mach-Zehnder optical modulator 12. The optical modulator 12 is thereby push-pull driven, resulting in continuous wave light output from the continuous wave light source 11 undergoing intensity modulation and phase modulation, and thereby creating optical duobinary signals having approximately half the bandwidth of normal NRZ encoded signals.

These optical duobinary signals are input into the push-pull type Mach-Zehnder optical modulator 13 and modulated by push-pull driving using synchronous clock signals. At this time, the operating voltage is set so that the transmittance is minimum when unmodulated, and the frequency of the drive clock signals is set to half (N/2 Hz) the bit rate N bit/s of the optical duobinary signals generated in the previous stage. As a result, the push-pull type Mach-Zehnder optical modulator 13 has gate characteristics that have a function of performing alternate phase RZ encoding, and DCS-RZ optical signals are generated.

Figure 4A:
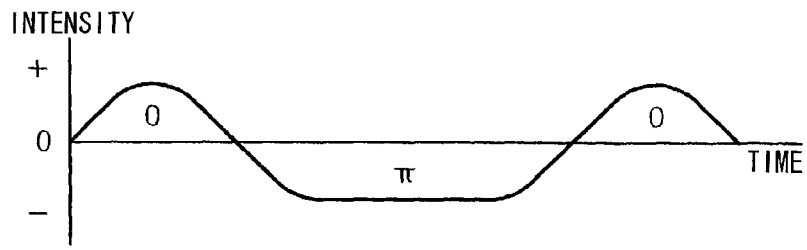
FIGS. 4A to 4D are diagrams for explaining the DCS-RZ optical signal generation principle in the first embodiment.
Figure 4B:
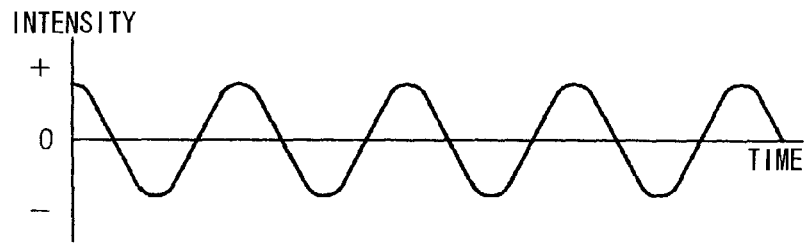
Figure 4C:
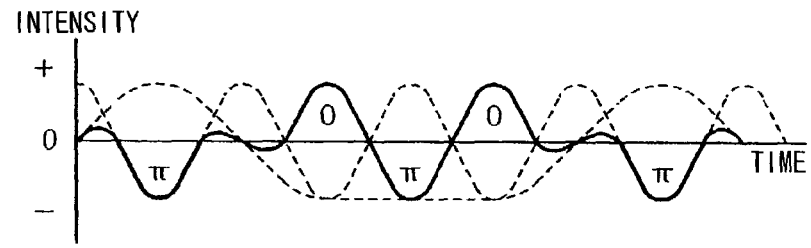
Figure 4D:
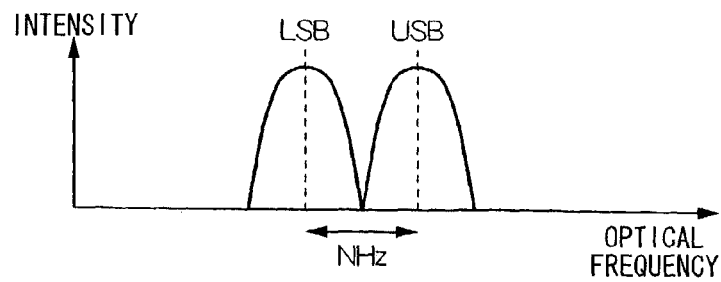

These operations are schematically shown in FIGS. 4A to 4D. FIG. 4A shows optical duobinary signals output from the push-pull type Mach-Zehnder optical modulator 12 of the previous stage. As is shown in FIG. 4B, the gate phase of the push-pull drive of the push-pull type Mach-Zehnder optical modulator 13 is set to match the phase of the optical duobinary signals of FIG. 4(a). As a result, RZ encoded optical signals having the inter-bit phase differences shown in FIG. 4C are obtained. This is the waveform of the DCS-RZ optical signals and, as is shown in FIG. 4D, the carrier component in the optical spectrum is suppressed so as to form an optical spectrum having two optical duobinary components with a frequency difference of N.

Note that the frequency of the clock signals driving the push-pull type Mach-Zehnder optical modulator 13 of the later stage may also be set generally as mN/2 Hz (wherein m is a positive integer) for the bit rate N bit/s of the optical duobinary signals generated in the previous stage. For example, if m=2, then the frequency difference of the two optical duobinary components of the DCS-RZ optical signals is double (i.e., 2 N Hz).

Figure 3:
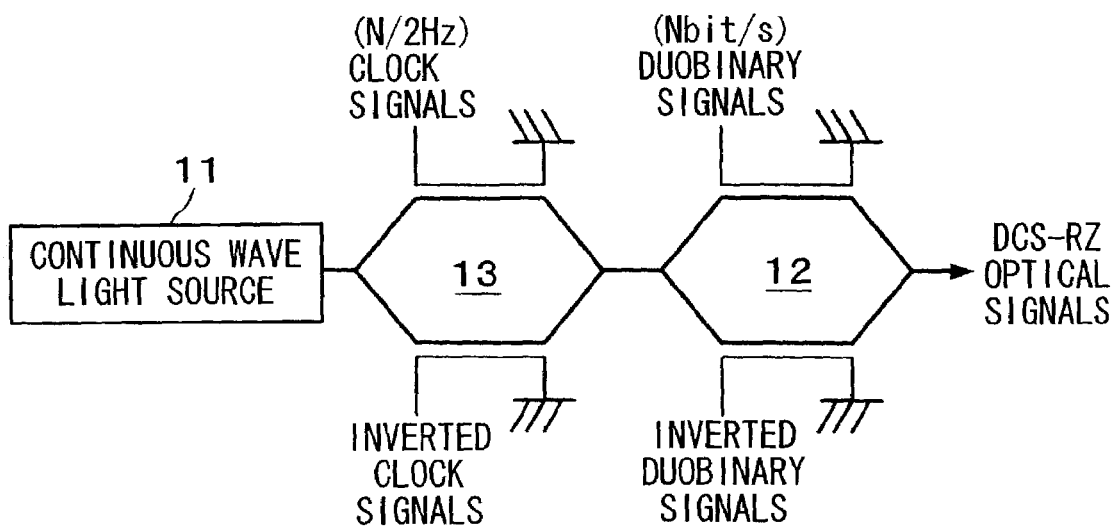
FIG. 3 is a block diagram showing a second structural example of the optical transmitting apparatus 1 of the first embodiment.

Second Structural Example of the Optical Transmitting Apparatus 1 of the First Embodiment FIG. 3 shows a second structural example of the optical transmitting apparatus 1. In FIG. 3 the optical transmitting apparatus 1 is structured such that continuous wave light output from the continuous wave light source 11 is input into the push-pull type Mach-Zehnder optical modulator 13, is modulated using clock signals, and undergoes alternate phase RZ encoding. The carrier suppressed clock signals thus generated are then input into the push-pull type Mach-Zehnder optical modulator 12 where they are modulated using duobinary signals. Namely, DCS-RZ optical signals are generated by push-pull driving the push-pull type Mach-Zehnder optical modulator 13 of the previous stage using clock signals (frequency of N/2), and by push-pull driving the push-pull type Mach-Zehnder optical modulator 12 of the later stage using duobinary signals (bit rate N).

Third Structural Example of the Optical Transmitting Apparatus 1 of the First Embodiment The push-pull driving signals for the push-pull type Mach-Zehnder optical modulator 12 shown in FIGS. 2 and 3 are not limited to duobinary signals and it is also possible to use multilevel partial response code, or binary NRZ code, or clock signals of a frequency that is independent from the clock signals that drive the push-pull type Mach-Zehnder optical modulator 13. In such cases the optical signals output from the optical transmitting apparatus 1 become carrier suppressed RZ encoded optical signals or carrier suppressed clock signals, and two partial response code components or binary NRZ code components or clock signals are divided into bands and are received in the optical receiving apparatus 2.

Figure 5A:
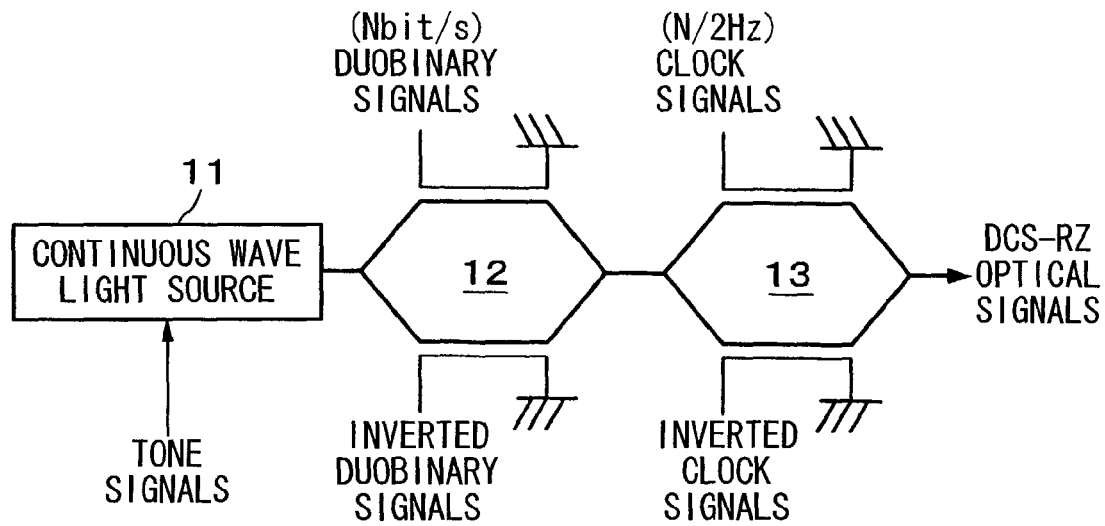
FIGS. 5A and 5B are block diagrams showing a fourth structural example of the optical transmitting apparatus 1 of the first embodiment.
Figure 5B:
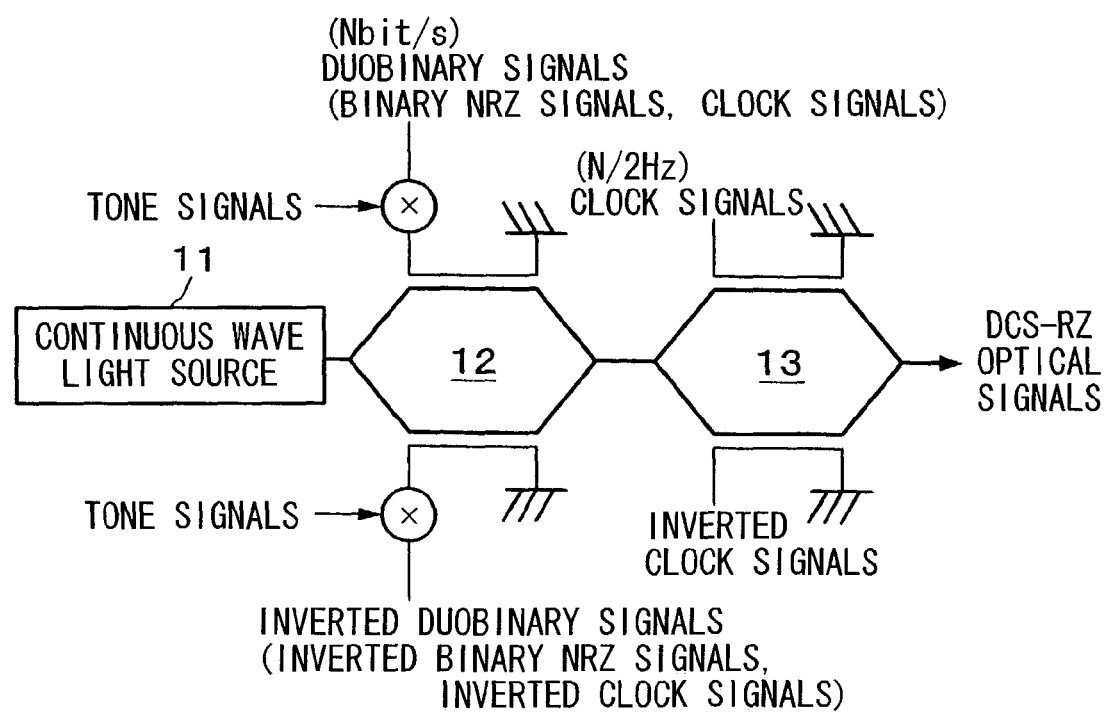

Fourth Structural Example of the Optical Transmitting Apparatus 1 of the First Embodiment FIGS. 5A and 5B show fourth structural examples of the optical transmitting apparatus 1. Here, examples corresponding to the first structural example shown in FIG. 2 is shown, however, it also applies to the second structural example shown in FIG. 3.

In FIG. 5A a continuous wave light source 11 is used that is structured so as to be able to superpose minute intensity modulation onto continuous wave light using tone signals supplied from the outside of the apparatus. In this case DCS-RZ optical signals are divided into bands and are received by the optical receiving apparatus 2, the tone signals are then extracted, and the phase state thereof is detected.

Instead of directly modulating the continuous wave light source 11 using tone signals, it is also possible to employ an external modulation structure that uses an electroabsorption optical modulator or an LN optical modulator.

Further, as is shown in FIG. 5B, it is also possible to employ a structure in which tone signals are superposed on the duobinary signals, the binary NRZ signals, or the clock signals for driving the push-pull type Mach-Zehnder optical modulator 12, and then the tone signals are extracted in the same way by the optical receiving apparatus 2.

Figure 6:
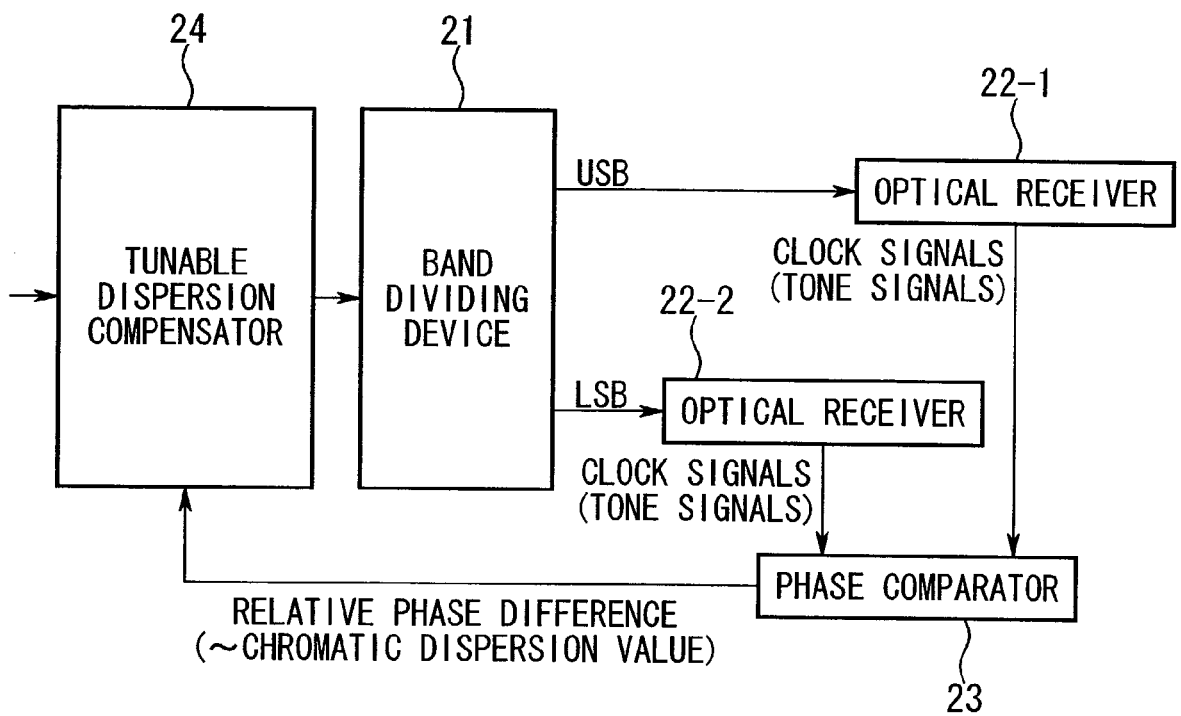
FIG. 6 is a block diagram showing a first structural example of the optical receiving apparatus 2 of the first embodiment.

First Structural Example of the Optical Receiving Apparatus 2 of the First Embodiment FIG. 6 shows a first structural example of the optical receiving apparatus 2. In FIG. 6, the optical receiving apparatus 2 is formed by a band dividing device 21 that separates the two SSB components (i.e., the USB component and the LSB component) among the spectrum components of transmitted DCS-RZ optical signals; optical receivers 22-1 and 22-2 that directly detect the respective USB and LSB components and extract the clock signal components; a phase comparator 23 that detects the relative phase difference between the clock signal components; and a tunable dispersion compensator 24 that inputs feedback using the relative phase difference as information for controlling chromatic dispersion and performs chromatic dispersion compensation for the optical transmission line 3.

As the band dividing device 21 it is possible to use an optical branching device and two optical band pass filters that separate USB and LSB components respectively, a Mach-Zehnder interferometer type optical filter formed on an optical fiber or optical waveguide, or an arrayed waveguide grating (AWG). The optical receivers 22 have a photoelectric conversion function and a signal reproduction function, and outputs clock signals extracted using timing extraction circuits. The phase comparator 23 employs a mixer that outputs a voltage that corresponds to the phase difference between two clock signal components output from each of the timing extraction circuits of the optical receivers 22-1 and 22-2, or determines the phase difference by performing waveform sampling via an A/D converter or the like.

The tunable dispersion compensator 24 changes a dispersion amount on the basis of chromatic dispersion control information, and a structure that employs, for example, an AWG (e.g., Hirano A. et al., "640 Gbit/s (16 channel/spl times/42.7 Gbit/s) WDM L-band DSF Transmission Experiment Using a 25 nm Bandwidth AWG Dispersion Slope Compensator", Electronics Letters, Vol. 36, No. 19, pp. 1638-1639, 2000) or VIPA (Shirasaki M. et al., "Variable Dispersion Compensator Using a Virtually Imaged Phase Array (VIPA) for 40 Gbit/s WDM Transmission Systems", ECOC 2000 PDP), or a variable fiber grating (Ohn. M. M. et al., "Dispersion Variable Fiber Bragg Grating Using a Piezoelectric Stack", Electronics Letters, Vol. 32, No. 21, pp. 2000-2001, 1996) may be used.

Figure 7:
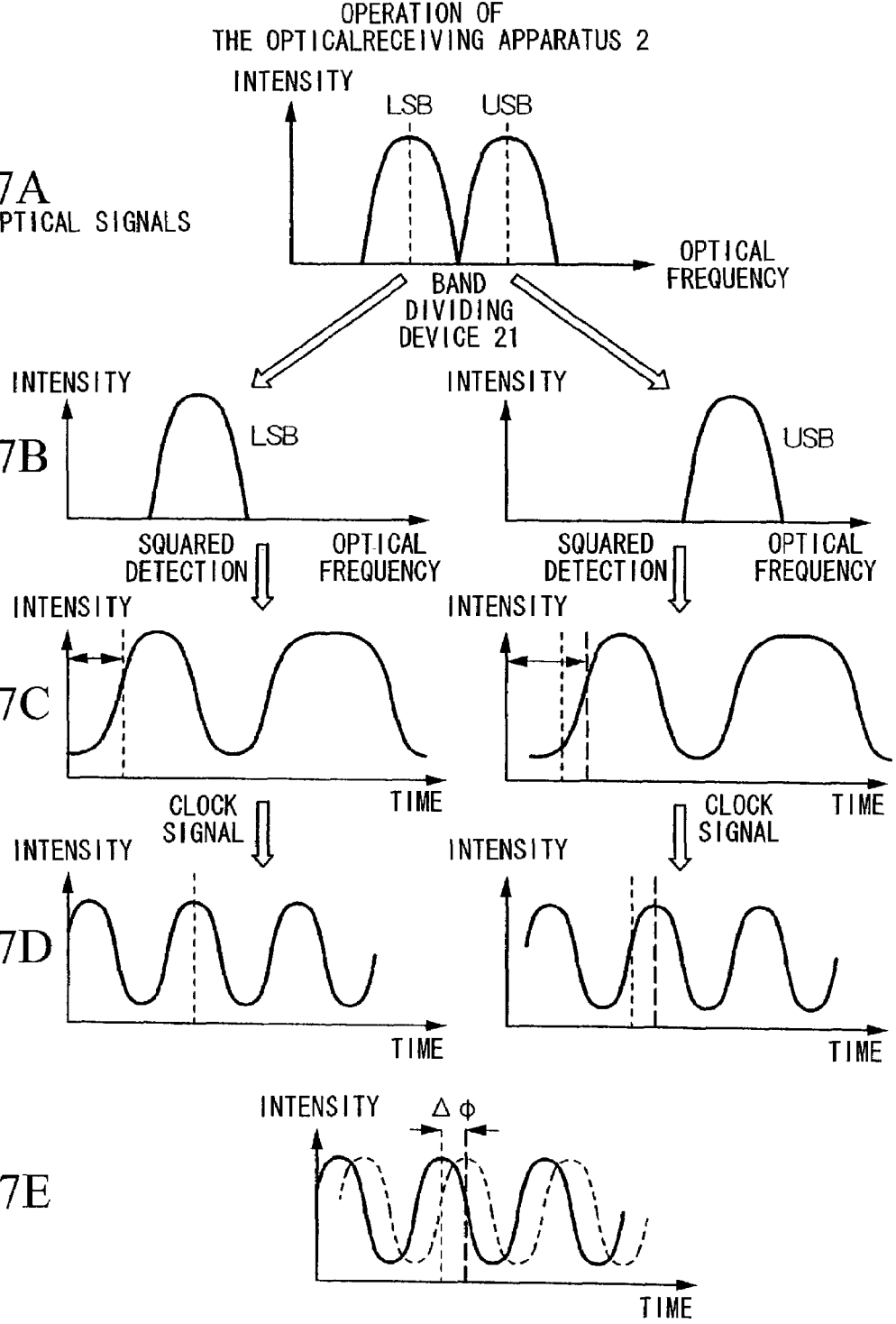
FIGS. 7A to 7E are diagrams for explaining the operation of the optical receiving apparatus 2 of the first embodiment.

A description will now be given of the operation of the optical receiving apparatus 2 with reference to FIGS. 7A to 7E. In the optical spectrum of DCS-RZ optical signals output from the optical transmitting apparatus 1, the two USB and LSB components are separated by a frequency corresponding to a bit-rate N (see FIG. 7A). DCS-RZ optical signals transmitted along the optical transmission line 3 are input into the band dividing device 21 of the optical receiving apparatus 2, and the USB and LSB components are respectively selected (FIG. 7B). The USB and LSB components each undergo squared detection by the optical receivers 22-1 to 22-2 (FIG. 7C), and clock signals are extracted using a timing extraction circuit (FIG. 7D). The phase comparator 23 then determines a relative phase difference $\Delta\Phi$ in the clock signals corresponding to the two USB and LSB components, and feeds it back to the tunable dispersion compensator 24 as chromatic dispersion control information. The tunable dispersion compensator 24 changes the dispersion amount based on the chromatic dispersion control information, and performs control such that a total chromatic dispersion value including the chromatic dispersion value of the optical transmission line 3 is the optimum value during reception. As a result, it is possible to keep the effect of chromatic dispersion on the optical transmission line 3 to a minimum and to maintain a high level and stable transmission quality.

Note that, here, a structure is employed in which clock signals are extracted by a timing extraction circuit of the optical receiver and the relative phase difference is then determined. However, if a structure is employed in which the phase difference is determined by waveform sampling via the aforementioned A/D converter or the like as the phase comparator 23, then it is not absolutely necessary to extract the clock signals and it is possible to obtain the required chromatic dispersion control information from the time delay of the waveform of the digital signal.

Moreover, as is shown in FIGS. 5A and 5B, when performing a transmission by superposing tone signals in the optical transmitting apparatus 1, it is also possible to employ a structure in which the tone signals are separated out using a band pass filter after the squared detection using the optical receivers 22-1 and 22-2, and the relative phase difference in the two tone signals is then detected by the phase comparator 23.

Figure 8:
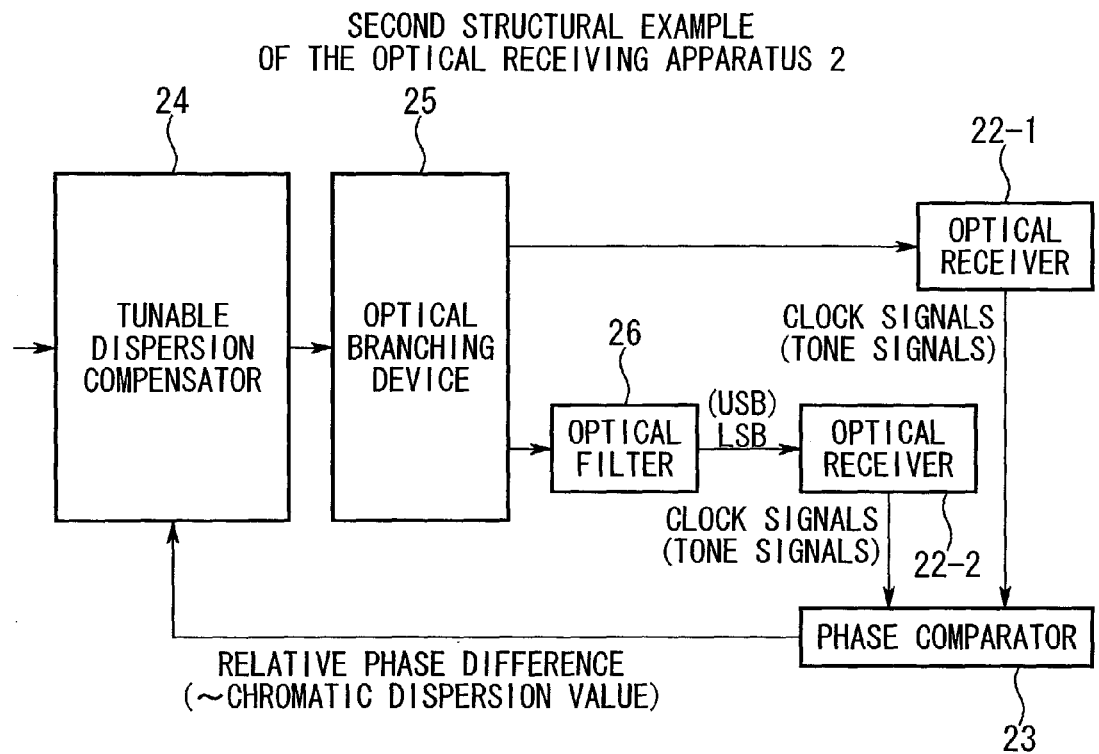
FIG. 8 is a block diagram showing a second structural example of the optical receiving apparatus 2 of the first embodiment.

Second Structural Example of the Optical Receiving Apparatus 2 of the First Embodiment FIG. 8 shows a second structural example of the optical receiving apparatus 2. In FIG. 8, the optical receiving apparatus 2 is formed by an optical branching device 25 that branches transmitted DCS-RZ optical signals into two; an optical filter 26 that separates out one SSB component (either the USB component or LSB component) from one of the branches; optical receivers 22-1 and 22-2 that directly detect the respective DCS-RZ optical signal and the separated SSB component and extract the clock signal component; a phase comparator 23 that detects the relative phase difference between the clock signal components; and a tunable dispersion compensator 24 that feedbacks the relative phase difference as information for controlling chromatic dispersion, and performs chromatic dispersion compensation for the optical transmission line 3.

The feature of the present structural example lies in the fact that DCS-RZ optical signals are directly received by the optical receiver 22-1, and the relative phase difference between the clock signal component extracted from the DCS-RZ optical signals and the clock signal component extracted from the USB component or LSB component thereof is determined. When the clock signal component is extracted from the DCS-RZ optical signals, because the clock signal component is generated by the beats of the two SSB components, no phase shift accompanied with chromatic dispersion is generated. Namely, the present structural example can be used as an extremely stable phase reference, and can improve the reliability of the chromatic dispersion control information being measured.

Figure 9:
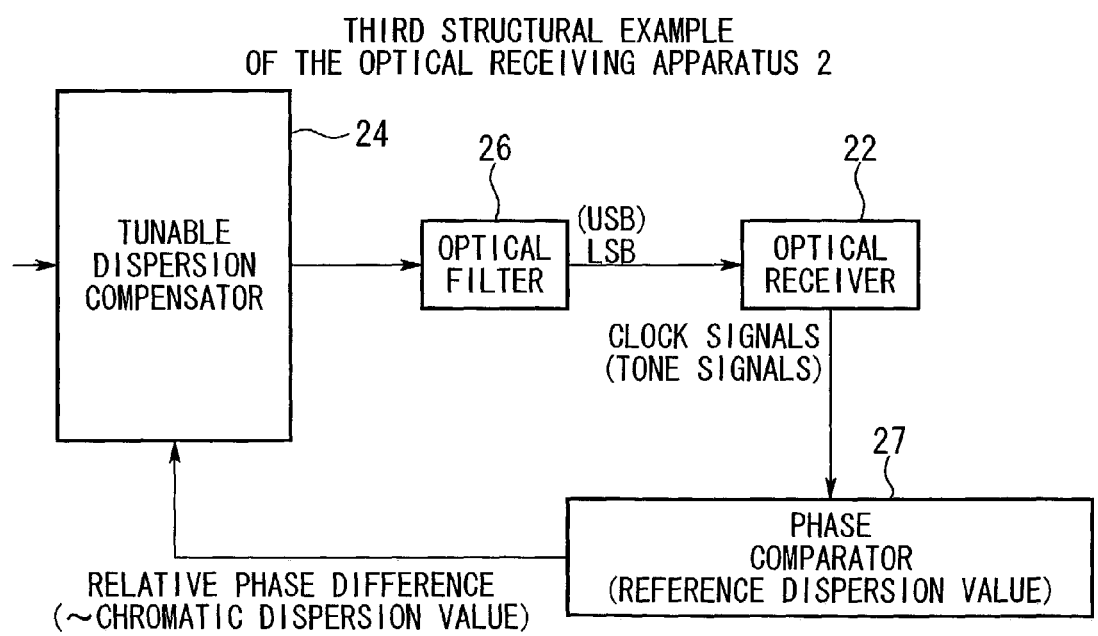
FIG. 9 is a block diagram showing a third structural example of the optical receiving apparatus 2 of the first embodiment.

Third Structural Example of the Optical Receiving Apparatus 2 of the First Embodiment FIG. 9 shows a third structural example of the optical receiving apparatus 2. In FIG. 9, the optical receiving apparatus 2 is formed by an optical filter 26 that separates out one SSB component (either the USB component or LSB component) from transmitted DCS-RZ optical signals; an optical receiver 22 that directly detects the SSB component and extracts the clock signal component; a phase comparator 27 that detects the relative phase difference between the above clock signal component and a phase state measured previously for a reference dispersion value; and a tunable dispersion compensator 24 that feedbacks the relative phase difference as information for controlling chromatic dispersion, and performs chromatic dispersion compensation for the optical transmission line 3.

The feature of the present structural example lies in the fact that a phase state of a clock signal component is measured in advance for a reference dispersion value and stored using the optical filter 26, the optical receiver 22, and the phase comparator 27, and the relative phase difference between this phase state and the phase state of the clock signal component of the DCS-RZ optical signal transmitted via the optical transmission line that is to be measured is detected. This feature allows the structure of the optical receiving apparatus 2 to be simplified.

Figure 10:
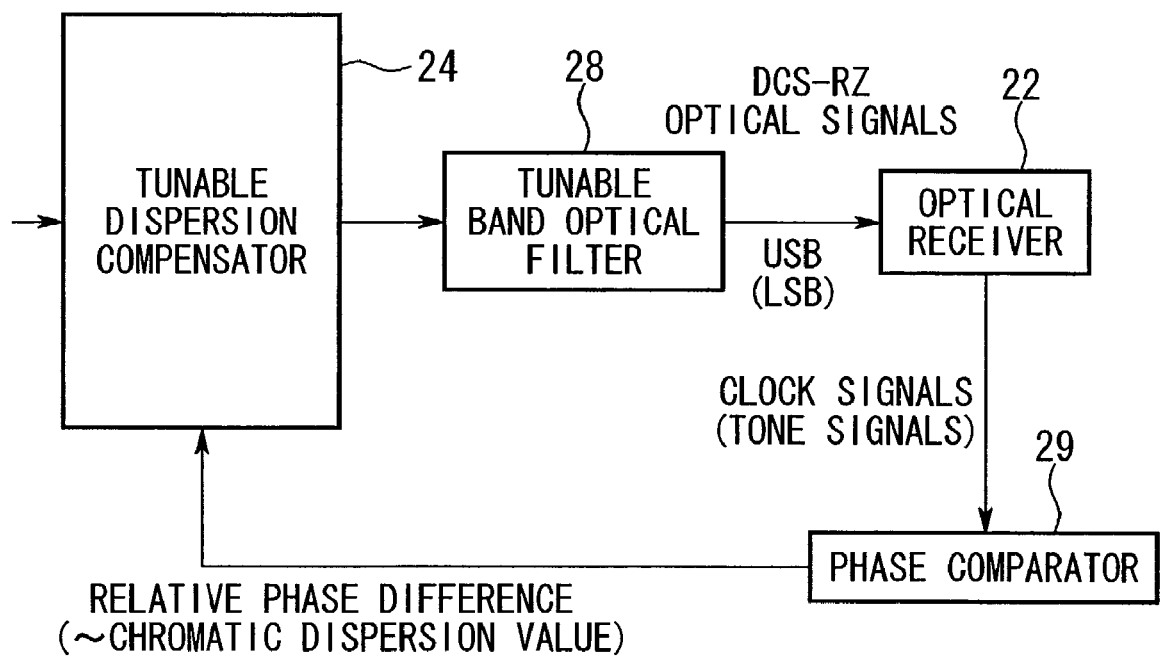
FIG. 10 is a block diagram showing a fourth structural example of the optical receiving apparatus 2 of the first embodiment.

Fourth Structural Example of the Optical Receiving Apparatus 2 of the First Embodiment FIG. 10 shows a fourth structural example of the optical receiving apparatus 2. In FIG. 10, the optical receiving apparatus 2 is formed by a tunable band optical filter 28 that alternately separates out a transmitted DCS-RZ optical signal and one SSB component (either the USB component or LSB component) thereof; an optical receiver 22 that directly detects the sequentially separated DCS-RZ optical signal and one SSB component and extracts the clock signal components thereof; a phase comparator 29 that detects the relative phase difference between the sequentially extracted clock signal components; and a tunable dispersion compensator 24 that feedbacks the relative phase difference as information for controlling chromatic dispersion, and performs chromatic dispersion compensation for the optical transmission line 3.

The feature of the present structural example ties in the fact that, firstly, a DCS-RZ optical signal is received and the clock signal component thereof detected using the tunable band optical filter 28, the optical receiver 22, and the phase comparator 29, and then, for example, the USB component is received and the clock signal component thereof is detected, and then the relative phase difference between the two clock signal components is detected. This feature allows the structure of the optical receiving apparatus 2 to be simplified.

Note that in the phase comparators 23, 27, and 29 of each of the optical receiving apparatuses 2 mentioned above, a phase comparison is performed using clock signals extracted by the optical receiver 22. However, it is also possible for the received waveform to be digitalized by the aforementioned A/D converter and for the chromatic dispersion control information to be obtained from the time delay of the digitalized waveform.

When transmitting with a tone signal superposed by the optical transmitting apparatus 1, it is also possible to employ a structure in which the relative phase difference between the two tone signals is detected by the phase comparator. Because it is possible to set a frequency for these tone signals independently from the bit-rate of the main signal, by changing the frequency of the tone signals the detection sensitivity and range of the relative phase difference between the two tone signals, namely, the detection sensitivity and range of the chromatic dispersion value of the optical transmission line 3 can be flexibly altered.

Moreover, in each of the optical receiving apparatuses 2 described above, dispersion compensation is performed at the receiving side, however, it is also possible to employ a structure in which the tunable dispersion compensator 24 is placed on the transmitting side, and chromatic dispersion control information detected by the optical receiving apparatus 2 is transferred to the transmitting side using a monitoring signal line or the like.

Next, the automatic dispersion compensating optical link system according to the second embodiment will be described.

Figure 11:
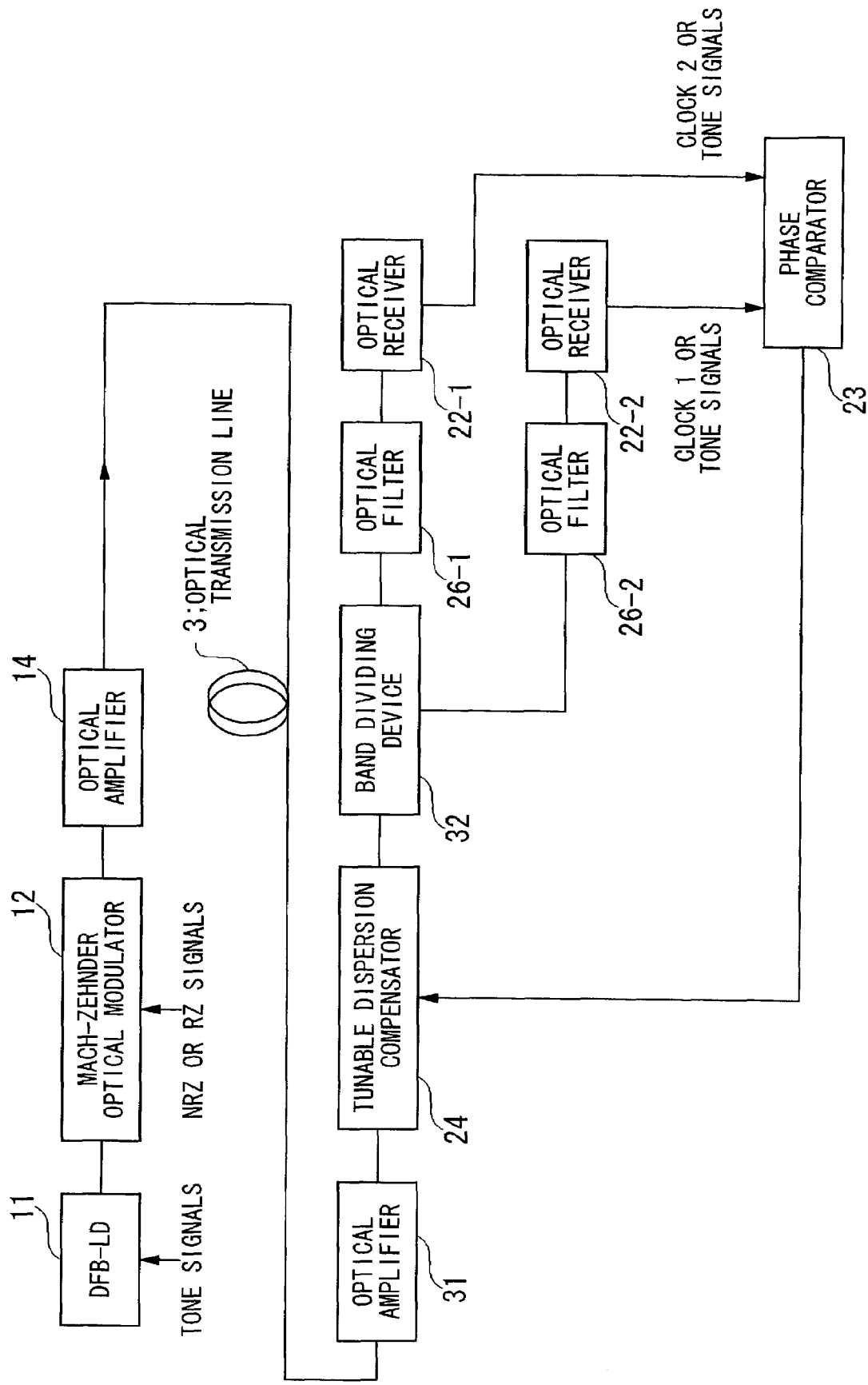
FIG. 11 is a block diagram showing a first structural example of the automatic dispersion compensating optical link system of the second embodiment.

First Structural Example of the Automatic Dispersion Compensating Optical Link System of the Second Embodiment FIG. 11 shows a first structural example of the automatic dispersion compensating optical link system. The automatic dispersion compensating optical link system shown in FIG. 11 is formed by a DFB-LD (i.e., a DFB laser diode) 11 that generates stable continuous wave light; a Mach-Zehnder optical modulator 12; an optical amplifier 14; an optical transmission line 3 along which optical signals are transmitted; an optical amplifier 31 that amplifies light attenuated because of loss due to the optical transmission line 3; a tunable dispersion compensator 24 that compensates group velocity dispersion on the optical transmission line 3; optical filters 26-1 and 26-2 that extract respectively VSB high frequency components and low frequency components of NRZ or RZ optical signals; optical receivers 22-1 and 22-2 that are equipped with band pass filters that perform squared detection of the respective optical signals extracted by the optical filters 26-1 and 26-2 and separate out tone signals from these detected signals when performing dispersion measurement using the tone signals; and a phase comparator 23 that measures the relative phase difference between the clock signals output from each of the optical receivers 22-1 and 22-2 and the phase of the reference dispersion values and the like.

Next, the operation of the present structural example will be described. The basic operation of the present structural example conforms to the system of the first embodiment, however, while in the first embodiment two SSB components, namely, both USB and LSB are separated and each is received, the feature of the operation of the present structural example lies in the fact that the VSB components of the NRZ or RZ optical signals is selected and is received by the optical filters 26-1 and 26-2, and the chromatic dispersion is detected using the relative difference between the two VSB components. Because the present structural example can be applied to normal NRZ or RZ optical signals without carrier suppressing means being required, low cost, high precision dispersion measuring can be achieved.

Figure 12:
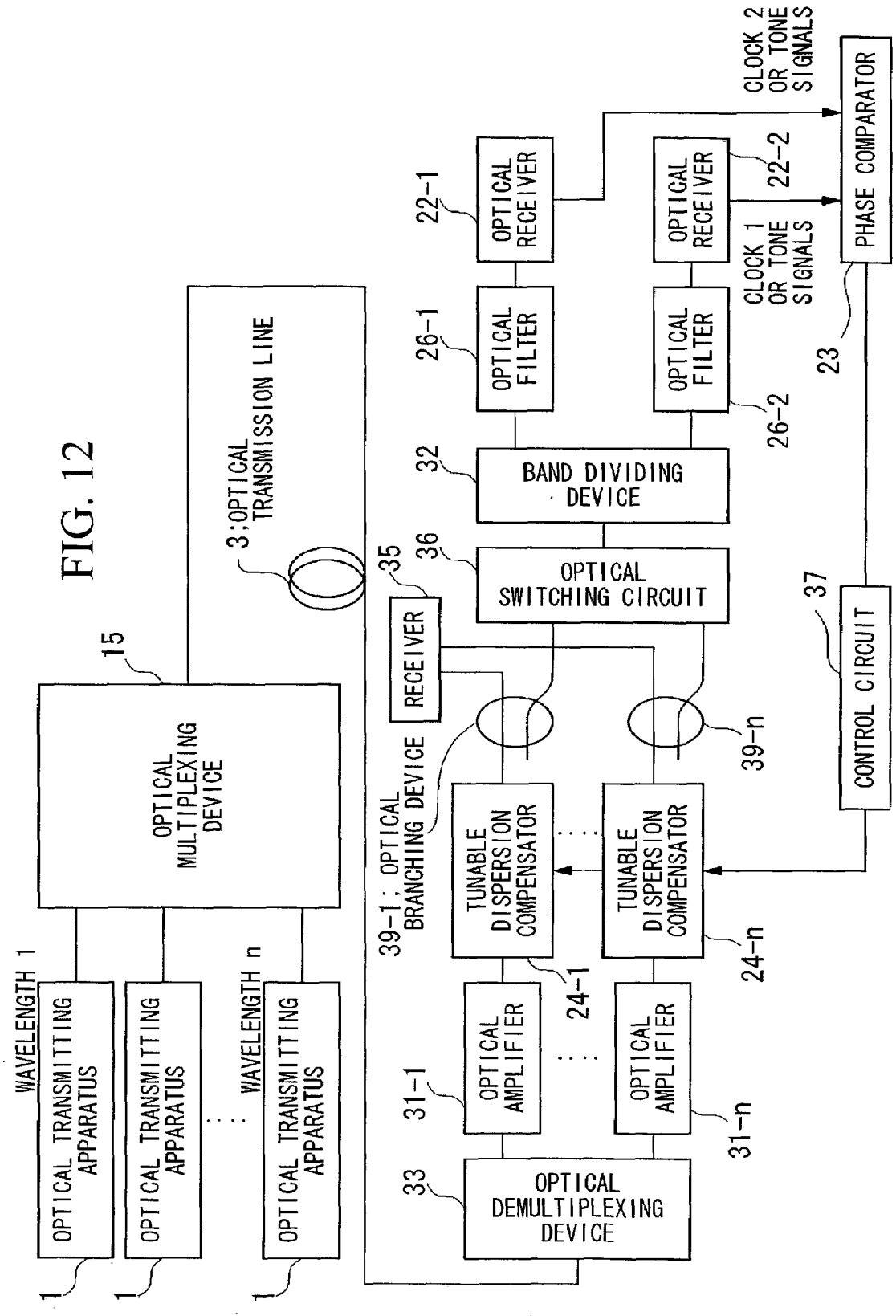
FIG. 12 is a block diagram showing a second structural example of the automatic dispersion compensating optical link system of the second embodiment.

Second Structural Example of the Automatic Dispersion Compensating Optical Link System of the Second Embodiment FIG. 12 shows a second structural example of the automatic dispersion compensating optical link system. The automatic dispersion compensating optical link system shown in FIG. 12 is formed by a plurality of optical transmitters 1 each formed by a DFB-LD 11, a Mach-Zehnder optical modulator 12, and an optical amplifier 14 and the like and each optical transmitter 1 having one optical wavelength from among an n (wherein n is a natural number) number of optical wavelength that are all different to each other; an optical multiplexing device 15 that performs wavelength-division multiplexing on optical signals generated by the optical transmitters 1; an optical transmission line 3 along which optical signals are propagated; an optical demultiplexing device 33 for separating the transmitted wavelength-division multiplexed signals into the respective wavelengths; a plurality of optical amplifiers 31-1 to 31-n that amplify light attenuated because of loss due to the optical transmission line 3; a plurality of tunable dispersion compensators 24-1 to 24-n that compensate group velocity dispersion on the optical transmission line 3; a plurality of optical branching devices 39-1 to 39-n that branch a portion of the light from the optical signals; an optical switching circuit 36 that selects an arbitrary channel from the branched optical signals; optical filters 26-1 and 26-2 that extract two SSB components of carrier suppressed RZ optical signals or extract respectively one single VSB component of NRZ or RZ optical signals; optical receivers 22-1 and 22-2 that are equipped with band pass filters that perform squared detection of the respective optical signals extracted by the optical filters 26-1 and 26-2 and separate out tone signals from these detected signals when performing dispersion measurement using the tone signals; a phase comparator 23 that measures the relative phase difference between the clock signals output from each of the optical receivers 22-1 and 22-2 and the phase of a reference dispersion value; and a control circuit 37 that calculates a chromatic dispersion value based on phase change amount information obtained by the phase comparator 23, and controls the tunable dispersion compensators 24-1 to 24-n so that the tunable dispersion compensators 24-1 to 24-n compensate the calculated chromatic dispersion value.

An arrayed waveguide grating or the like can be used for the optical multiplexing device 15 and the optical demultiplexing device 33. An arrayed waveguide grating or a Mach-Zehnder interferometer type optical filter can be used for the optical filters 26-1 and 26-2. In the present structural example, an optical filter having periodic transmittance characteristics is used for the optical filters 26-1 and 26-2 and it is desirable that an optical filter is used whose repetitive period is an integral fraction of the repetition period, namely, of the wavelength interval of the optical demultiplexing device 33.

Next, the operation of the present structural example will be described. The basic operation of the present structural example conforms to the system of the first embodiment, however, while in the first embodiment only the optical signal of a single wavelength was considered, the present structural example is applied to a wavelength-division multiplexing system having a plurality of wavelength channels. According to the present structural example, because it is possible to measure the chromatic dispersion amount of each wavelength channel individually, it is possible to compensate each wavelength channel individually by the optimum wavelength compensation amount for that wavelength channel. Moreover, because only one detection circuit needs to be used for this compensation, a low-cost, stable optical link system can be achieved. In addition, if a Mach-Zehnder interferometer type optical filter or the like having a period equivalent to the wavelength interval is used for the optical filters 26-1 and 26-2, the optical signal of each channel can each be separated at the same time into USB and LSB components.

Figure 13:
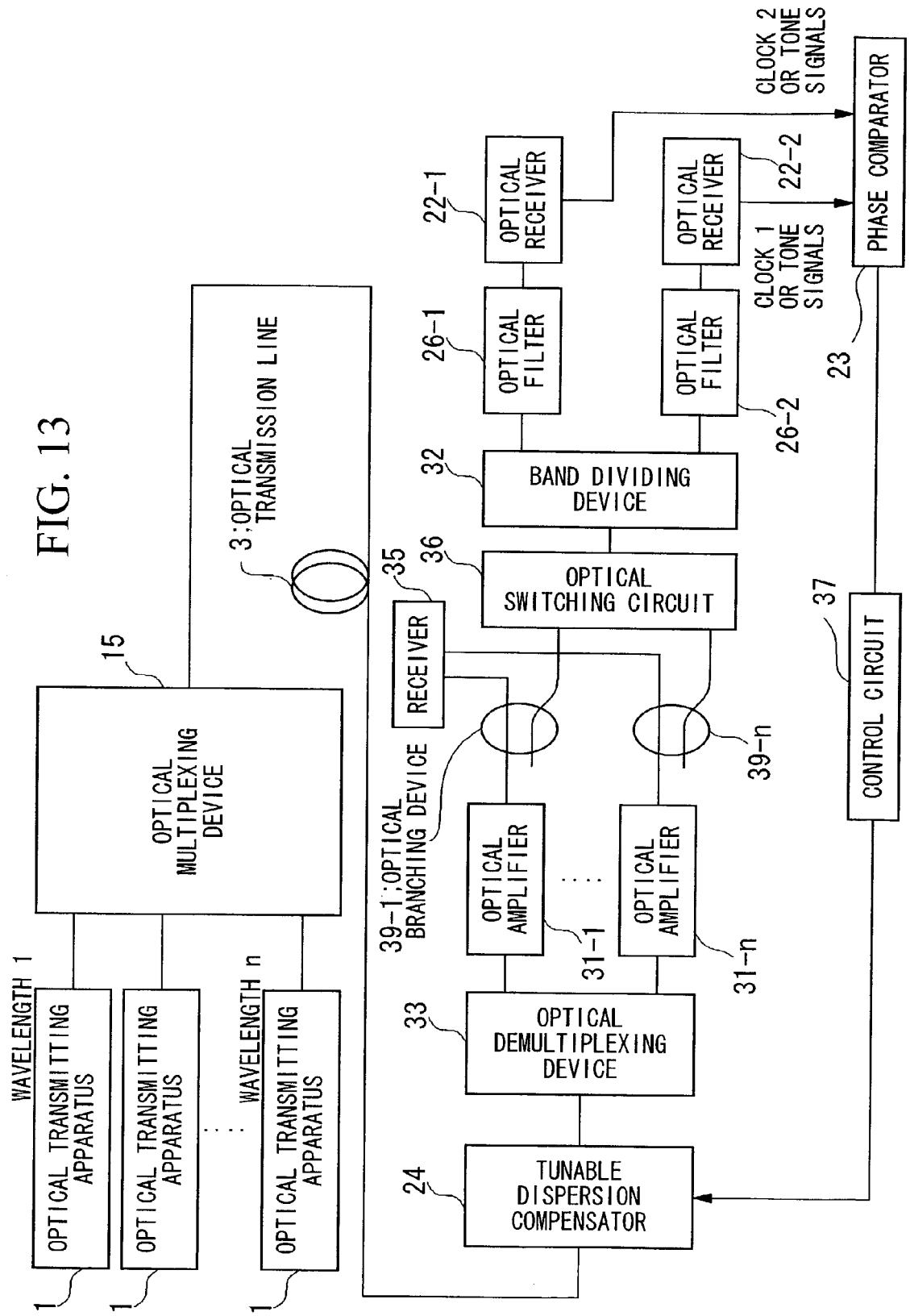
FIG. 13 is a block diagram showing a third structural example of the automatic dispersion compensating optical link system of the second embodiment.

Third Structural Example of the Automatic Dispersion Compensating Optical Link System of the Second Embodiment FIG. 13 shows a third structural example of the automatic dispersion compensating optical link system. The automatic dispersion compensating optical link system shown in FIG. 13 is formed by a plurality of optical transmitters 1 each formed by a DFB-LD 11, a Mach-Zehnder optical modulator 12, and an optical amplifier 14 and the like and each having a different optical wavelength; an optical multiplexing device 15 that performs wavelength-division multiplexing on optical signals generated by the optical transmitters 1; an optical transmission line 3 along which optical signals are propagated; a tunable dispersion compensator 24 that compensates group velocity dispersion including the dispersion slope on the optical transmission line 3; an optical demultiplexing device 33 for separating the transmitted wavelength-division multiplexed signals into the respective wavelengths; a plurality of optical amplifiers 31-1 to 31-n that amplify light attenuated because of loss due to the optical transmission line 3; a plurality of optical branching devices 39-1 to 39-n that branch a portion of the light from the optical signals; an optical switching circuit 36 that selects an arbitrary channel from the branched optical signals; optical filters 26-1 and 26-2 that extract two SSB components of carrier suppressed RZ optical signals or extract respectively one single VSB component of NRZ or RZ optical signals; optical receivers 22-1 and 22-2 that are equipped with band pass filters that perform squared detection of the respective optical signals extracted by the optical filters 26-1 and 26-2 and separate out tone signals from these detected signals when performing dispersion measurement using the tone signals; a phase comparator 23 that measures the relative phase difference between the clock signals output from each of the optical receivers 22-1 and 22-2 and the phase of a reference dispersion value; and a control circuit 37 that calculates a chromatic dispersion value based on phase change amount information obtained by the phase comparator 23, and controls the tunable dispersion compensators 24-1 to 24-n so that the tunable dispersion compensators 24-1 to 24-n compensate the calculated chromatic dispersion value.

Next, the operation of the present structural example will be described. The basic operation of the present structural example conforms to the second system of the second embodiment, however, while in the structural example of the second system of the second embodiment, group velocity dispersion is compensated for individual wavelength channels, in the present structural example a tunable dispersion compensator 24 is provided that is able to compensate all of the plurality of wavelength channels including the dispersion slope at once. Because it is possible to compensate a plurality of wavelength channels at once the number of tunable dispersion compensators 24 that are required can be reduced, enabling an even lower cost system to be provided.

Next, the automatic dispersion compensating optical link system according to the third embodiment will be described.

Figure 14:
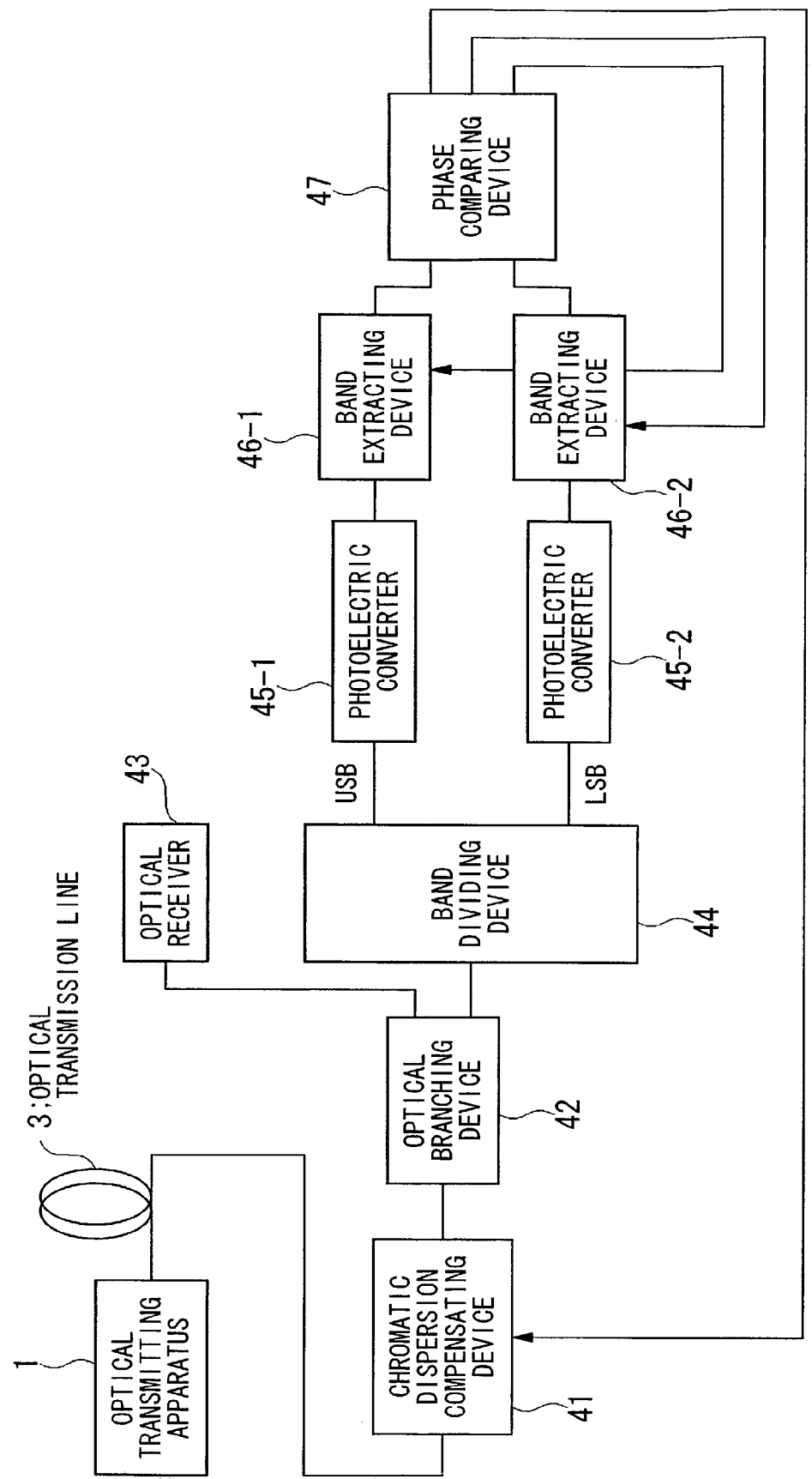
FIG. 14 is a block diagram showing a first structural example of the automatic dispersion compensating optical link system of the third embodiment.

First Structural Example of the Automatic Dispersion Compensating Optical Link System of the Third Embodiment FIG. 14 shows a first structural example of the automatic dispersion compensating optical link system. The optical transmitting apparatus 1 shown in FIG. 14 transmits carrier suppressed RZ encoded optical signals generated using carrier suppressing means and binary NRZ code or partial response code. The carrier suppressed RZ encoded optical signal transmitted via the optical transmission line 3 is optically branched by an optical branching device 42, and one branch is input into an optical receiver 43 while the other branch is input into a band dividing device 44. After the binary NRZ code or the partial response code has been extracted by the band dividing device 44, photoelectric conversion is performed by photoelectric converters 45-1 and 45-2 so that the respective components are converted into basebands. Next, bands having an arbitrary center frequency are extracted from the converted basebands in band extracting devices 46-1 and 46-2, and a chromatic dispersion compensating device 41 is controlled so as to compensate the chromatic dispersion based on a chromatic dispersion value calculated from phase information output from a phase comparing device 47.

It is also possible for an optical amplifier to be disposed at either the transmission end or the receiving end of the optical transmission line 3 or else partway between the two so that sufficient optical power is obtained to ensure a sufficient SN ratio in the optical receiver.

Hereinbelow, carrier suppressed RZ encoded optical signals (referred to below as DCS-RZ optical signals) generated from duobinary code are used, however, carrier suppressed RZ encoded optical signals that use binary RNZ signals (CS-RZ optical signals) or multilevel partial response code may also be used. A detailed description concerning CS-RZ optical signals is given in "320-Gbit/s (8×40 Gbit/s) WDM Transmissions Over 367 km Zero-Dispersion-Flattened Line with 120 km Repeater Spacing Using Carrier-Suppressed Return-to-Zero Pulse Format", Y. Miyamoto et al., Tech. Dig. OAA '99, PDP4, 1999. A detailed description concerning DCS-RZ optical signals is given in "Duobinary Carrier Suppressed Return-to-Zero Format and its Application to 100 GHz-Spaced 8×43 Gbit/s DWDM Unrepeatered Transmissions Over 163 km" Y. Miyamoto et al., Tech. Dig. OFC2001, Vol. 2, 2001".

As is shown in FIG. 24A, the optical spectrum of DCS-RZ signals has two optical duobinary components (USB and LSB) with a frequency difference N (bit rate) in which a carrier component has been suppressed. Two optical band pass filters that respectively extract the USB and LSB components, a Mach-Zehnder interferometer type optical filter formed on an optical fiber or optical waveguide, or an arrayed waveguide grating can be used as the band dividing device 44. The phase comparing device 47 is structured so as to use a mixer that outputs a voltage that corresponds to the phase difference between two clock signals output from the band extracting devices 46-1 and 46-2, or is structured so as to determine the phase difference by performing waveform sampling via an A/D converter or the like. The chromatic dispersion compensating device 41 is structured so as to change a chromatic dispersion value on the basis of chromatic dispersion control information, and a structure that employs, for example, an AWG, a structure that employs virtually imaged phased array (VIPA), or a structure that employs a tunable fiber grating may be used for the chromatic dispersion compensating device 41.

Next, the operation of the system shown in FIG. 14 will be described while referring to FIGS. 24A to 24E. DCS-RZ signals transmitted from the optical transmitting apparatus 1 via the optical transmission line 3 (FIG. 24A) are divided into USB and LSB components by the band dividing device 44 (FIG. 24B). The respective components are then converted into basebands by photoelectric conversion. Next, arbitrary center frequency components (f1 and f2 in FIG. 24C) are extracted by the band extracting devices 46-1 and 46-2 from the basebands converted from the USB and LSB components (FIG. 24C), and clock signals are generated (FIG. 24D). The phase comparing device 47 then determines a relative phase difference ΔΦ in the clock signals generated from the USB and LSB components (FIG. 24E), and controls the chromatic dispersion compensating device 41 based on the determined result.

The range of chromatic dispersion values capable of being detected by this operation is inversely proportional to the repetitive frequency of the clock signal whose relative phase difference is being determined (FIGS. 25A and 25B). The range of relative phase differences that can be detected when performing phase detection using clock signals having a low repetitive frequency (f1) is greater than when performing phase detection using clock signals having a high repetition frequency (f2), allowing the detectable dispersion values to be increased. On the other hand, because the amount of change of the relative phase difference relative to the repetitive period is proportional to the repetitive frequency, the resolution decreases.

In the present structural example, because clock signals having an arbitrary center frequency can be extracted this structure can be applied for the precise compensation of chromatic dispersion while the system is in operation, in addition to the broad chromatic dispersion compensation performed when the system is first implemented and the like.

Figure 15:
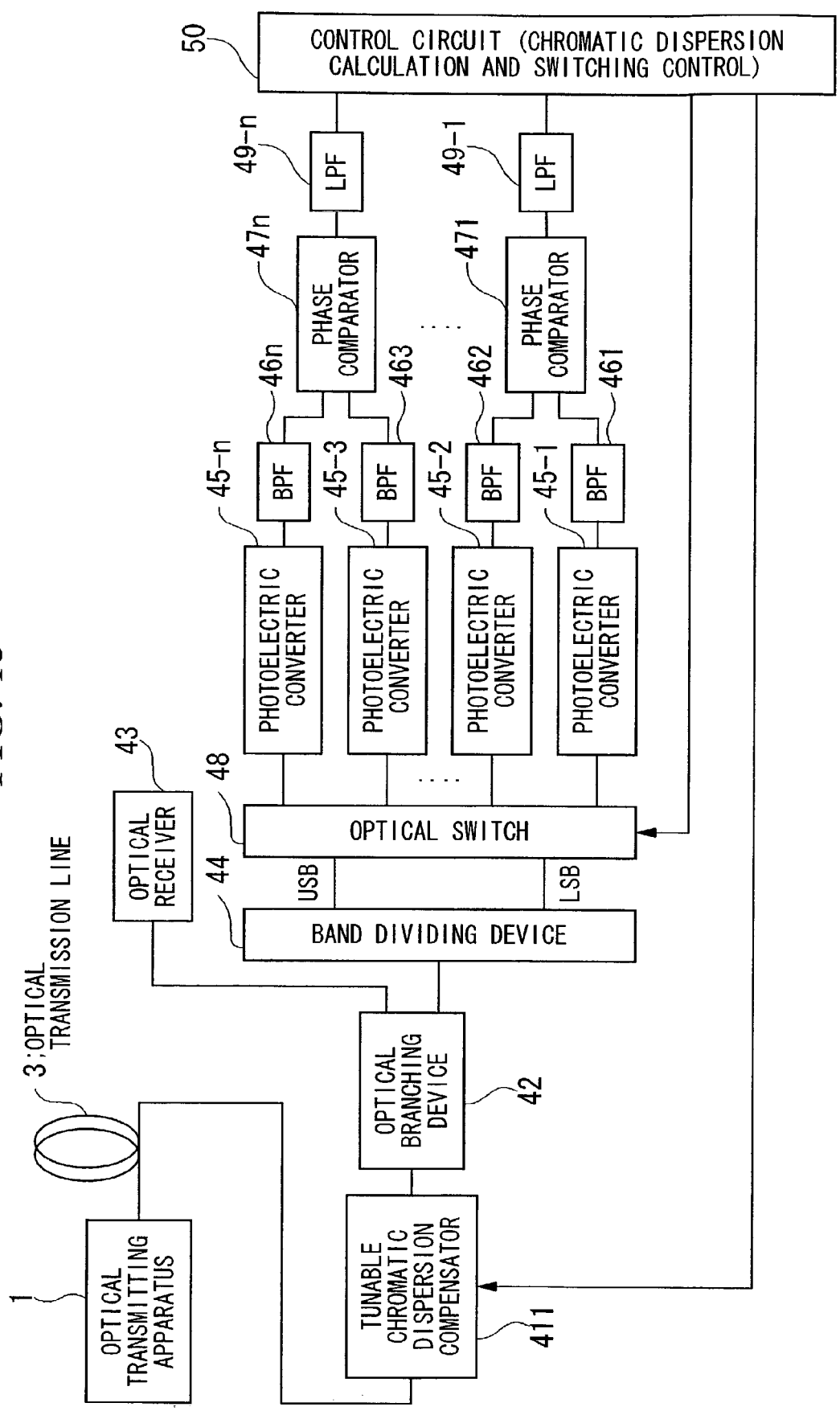
FIG. 15 is a block diagram showing a second structural example of the automatic dispersion compensating optical link system of the third embodiment.

Second Structural Example of the Automatic Dispersion Compensating Optical Link System of the Third Embodiment FIG. 15 shows a second structural example of the automatic dispersion compensating optical link system. The present structural example employs a structure in which a USB component and an LSB component that have been divided by the band dividing device 44, and the USB and the LSB components are switched by an optical switch 48, and the phases of two signals passing through band pass filters (BPF) 461 to 46n each having a desired center frequency are compared by a phase comparator 471, and are then output to a control circuit 50 via a low pass filter (LPF) 49-1. The optical switch 48 mechanically switches the optical waveguide and may be formed by an MEMS switch, an acousto-optic (AO) switch, or a thermo-optic (TO) switch. A dielectric filter or a waveguide filter may be used for the BPF 461 to 46n.

By employing the above structure, a low cost structure can be achieved by using the phase comparators 471 to 47n and the photoelectric converters 45-1 to 45-n having operating frequencies that correspond to the center frequencies of the respective BPF 461 to 46n.

Figure 16:
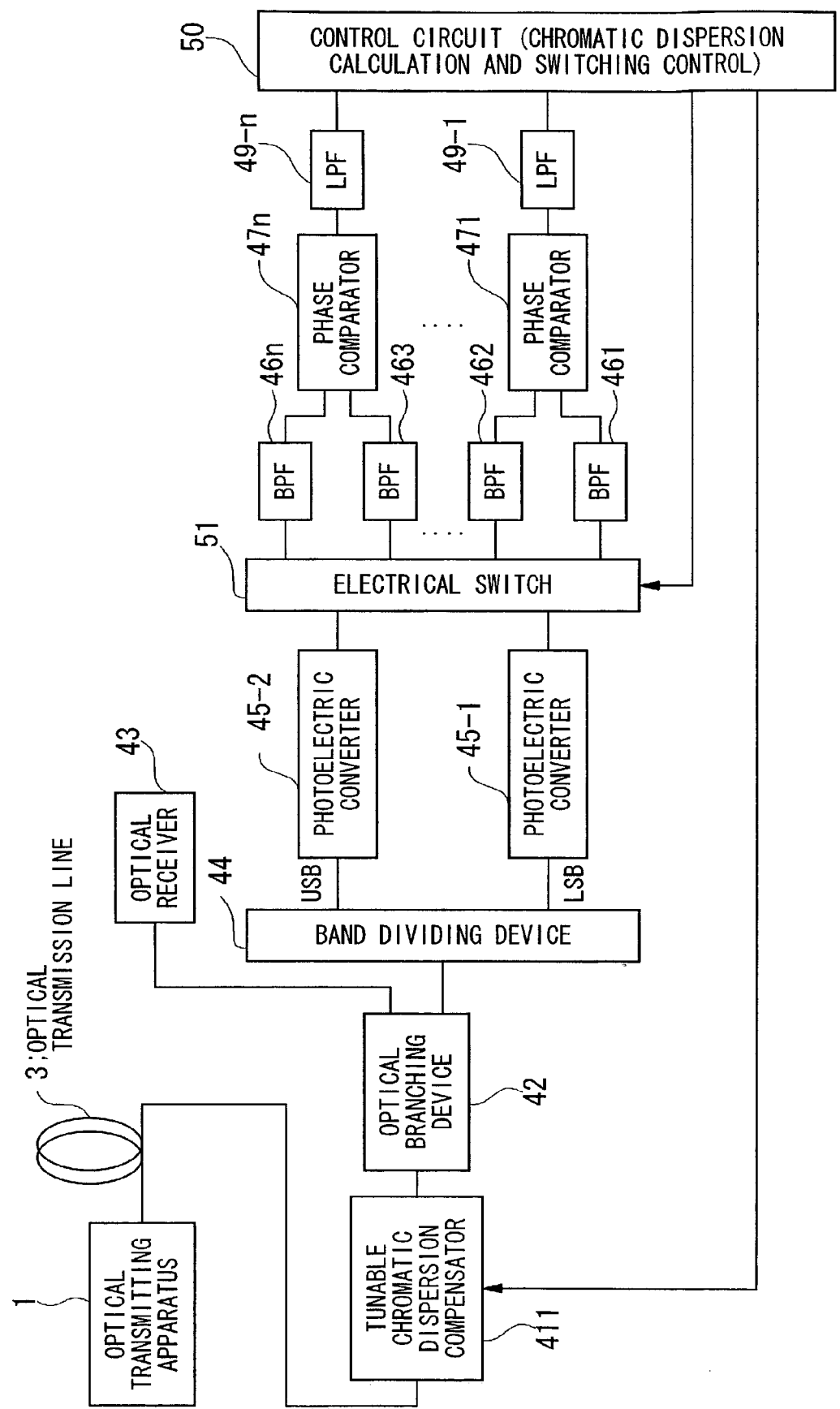
FIG. 16 is a block diagram showing a third structural example of the automatic dispersion compensating optical link system of the third embodiment.

Third Structural Example of the Automatic Dispersion Compensating Optical Link System of the Third Embodiment FIG. 16 shows a third structural example of the automatic dispersion compensating optical link system. The present structural example employs a structure in which after a USB component and an LSB component that have been divided by the band dividing device 44 have been converted into basebands by the photoelectric converters 45-1 and 45-2, and the baseband signals are switched by an electrical switch 51, phases of two signals that have passed through the band pass filters (BPF) 461 to 46n each having a desired center frequency are compared by the phase comparator 471, and are then output to a control circuit 50 via a low pass filter (LPF) 49-1. The electrical switch 51 mechanically switches the coaxial cables and may be formed by a digital IC.

By employing the above structure, it is possible for the photoelectric converters 45-1 and 45-2 to be shared. In addition, the electrical components can be integrated and the apparatus can be reduced in size and made more stable.

Figure 17:
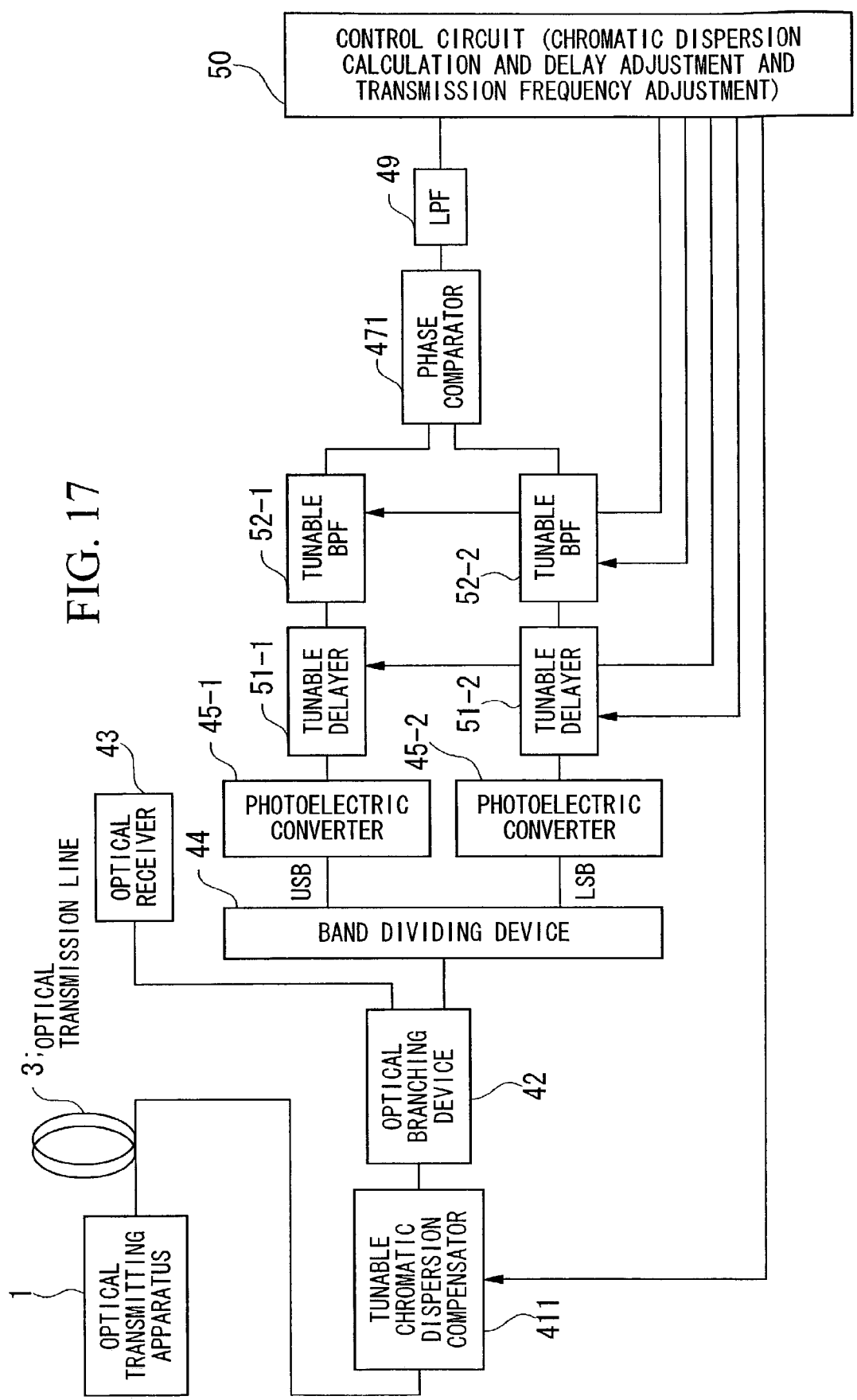
FIG. 17 is a block diagram showing a fourth structural example of the automatic dispersion compensating optical link system of the third embodiment.

Fourth Structural Example of the Automatic Dispersion Compensating Optical Link System of the Third Embodiment FIG. 17 shows a fourth structural example of the automatic dispersion compensating optical link system. In order to generate clock signals having the desired repetitive frequency, the present structural example is provided with tunable BPF 52-1 and 52-2 that can be adjusted to the desired center frequency.

By employing the above structure, it is possible for the components to be shared, which allows the apparatus to be reduced in size and made more stable. In addition, it is possible to detect a chromatic dispersion value using clock signals having an arbitrary repetitive frequency.

Moreover, when detecting a relative phase difference by changing the repetitive frequency, in order to set an initial value for each repetitive frequency it is necessary to provide a delay corresponding to the repetitive frequency using tunable delayers 51-1 and 51-2.

However, for example, the method below may be used in order to make the tunable delayers 51-1 and 51-2 unnecessary. Firstly, a delay corresponding to a repetition frequency (F) in which a nonstandard chromatic dispersion value can be detected in the link system being introduced, is applied. In order to improve the detection resolution of the dispersion value, the relative phase difference is detected using clock signals having a repetitive frequency of 2n (wherein n is an integer)+1 times the frequency (F). By selecting this repetitive frequency it is possible to set an initial value without altering the delay initially applied, and it is possible to correctly detect the relative phase difference including the polarity thereof. Therefore, the tunable delayers 51-1 and 51-2 can be omitted and the size of the apparatus can be reduced.

Next, the automatic dispersion compensating optical link system of the fourth embodiment will be described.

Figure 18:
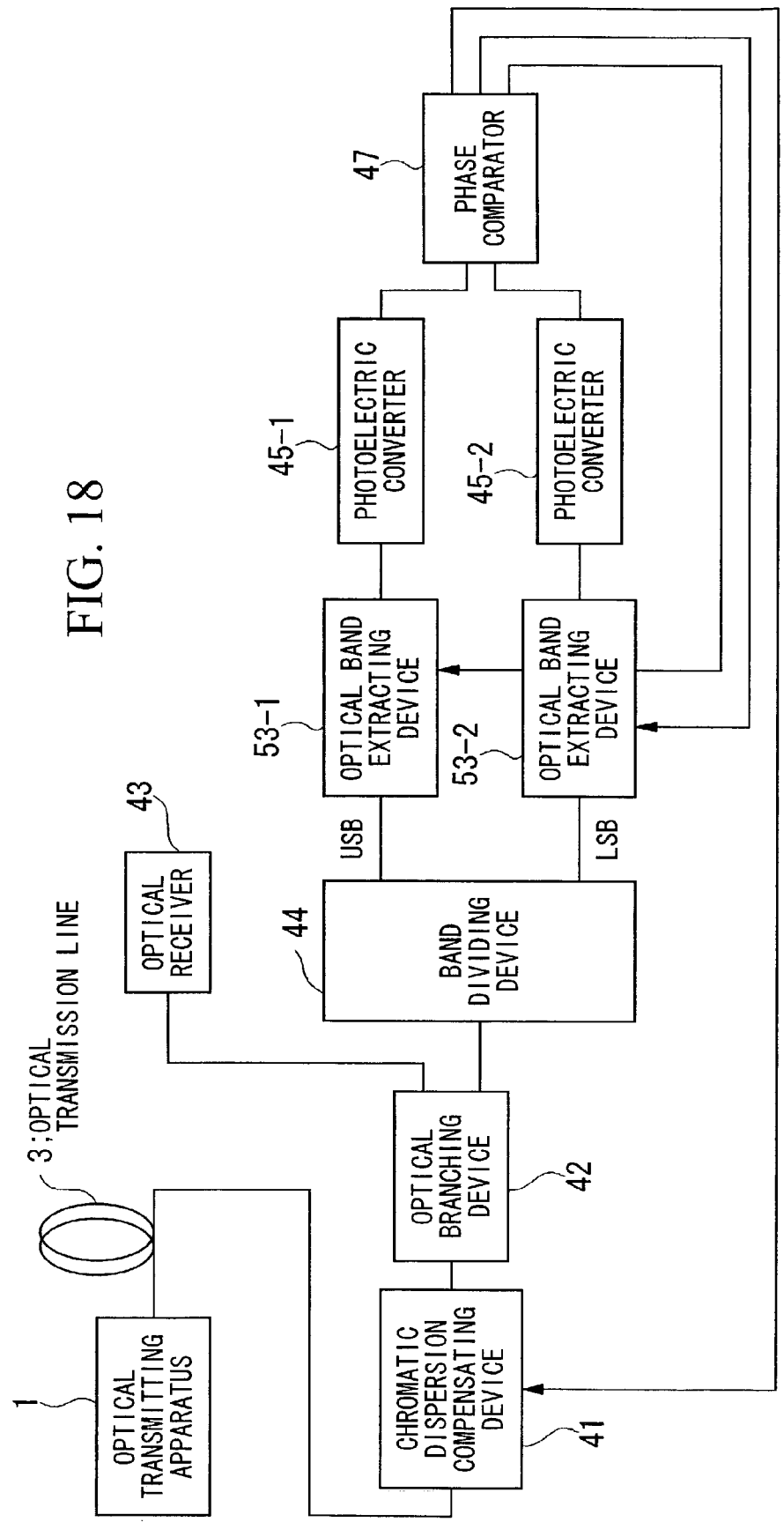
FIG. 18 is a block diagram showing a first structural example of the automatic dispersion compensating optical link system of the fourth embodiment.

First Structural Example of the Automatic Dispersion Compensating Optical Link System of the Fourth Embodiment FIG. 18 shows a first structural example of the automatic dispersion compensating optical link system. The feature of the structural example shown in FIG. 18 that is different from the first structural example of the third embodiment (FIG. 14) is the fact that optical band extracting devices 53-1 and 53-2 are used as means for generating clock signals having an arbitrary repetitive frequency.

Next, the operation of the system shown in FIG. 18 will be described while referring to FIGS. 26A to 26E. DCS-RZ signals transmitted from the optical transmitting apparatus 1 via the optical transmission line 3 are divided into USB and LSB components by the band dividing device 44 (FIG. 26A). Next, the carriers of the USB and LSB components respectively and arbitrary center wavelength components are extracted by the optical band extracting devices 53-1 and 53-2 from the divided USB and LSB components (FIG. 26B). When the USB carrier and an arbitrary center wavelength component and the LSB carrier and an arbitrary wavelength component are then input respectively into a photoelectric conversion devices, they are converted into beat signals that correspond to the optical frequency difference between the carrier and the arbitrary center wavelength (f1 and f2 in FIG. 26C) (FIG. 26C), and clock signals that have this optical frequency difference as their repetitive frequency are generated (FIG. 26D). The phase comparing device then determines a relative phase difference $\Delta\Phi$ in the clock signals generated from the USB and LSB components (FIG. 26E), and controls the chromatic dispersion compensating device based on the determined result.

In the present structural example, because it is possible to extract an arbitrary center frequency component this structure can be used for the precise compensation of chromatic dispersion while the system is in operation, in addition to the broad chromatic dispersion compensation performed when the system is first implemented and the like. Moreover, by using the optical band extracting devices 53-1 and 53-2, the same structure can be applied to even faster optical signals. As a result, bit rate flexibility with regard to the band extracting device so that if even higher speeds are envisioned the structure has the advantage of the number of high frequency components such as the band pass filter being able to be reduced.

Figure 19:
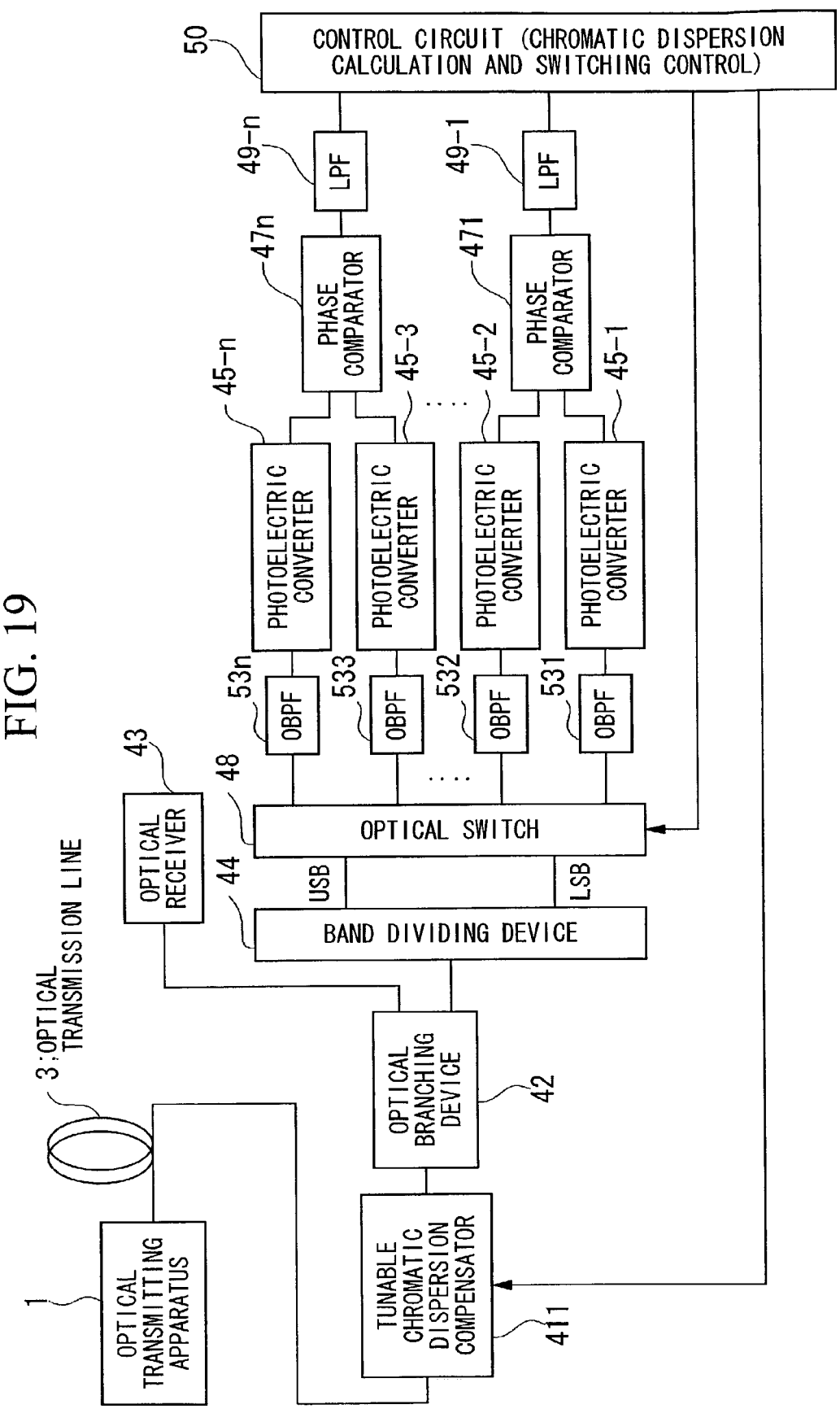
FIG. 19 is a block diagram showing a second structural example of the automatic dispersion compensating optical link system of the fourth embodiment.

Second Structural Example of the Automatic Dispersion Compensating Optical Link System of the Fourth Embodiment FIG. 19 shows a second structural example of the automatic dispersion compensating optical link system. In this structural example, the USB component and LSB component that have been divided by the band dividing device 44 is switched by the optical switch 48, and the optical signals passing through optical band bass filters (OBPF) 531 to 53n that extract optical bands having desired center wavelengths are converted into electrical signals by photoelectric converters 45-1 and 45-2, and the phases of the two electrical signals are then compared by the phase comparator 471. The output from the phase comparator 471 then passes through an LPF 49-1 and is then output to the control circuit 50. As the OBPF 531 to 53n it is possible to use a dielectric multilayer filter, a fiber grating filter, a Mach-Zehnder interferometer type optical filter formed on an optical fiber or on an optical waveguide, or an arrayed waveguide grating.

By employing the above structure, it is sufficient if the photoelectric converters 45-1 to 45-n and the phase comparators 471 to 47n have an operating frequency that corresponds to the optical frequency difference between the center frequencies of the respective OBPF 531 to 53n and the carriers of the USB component or LSB component. As a result, a low cost structure can be achieved.

Figure 20:
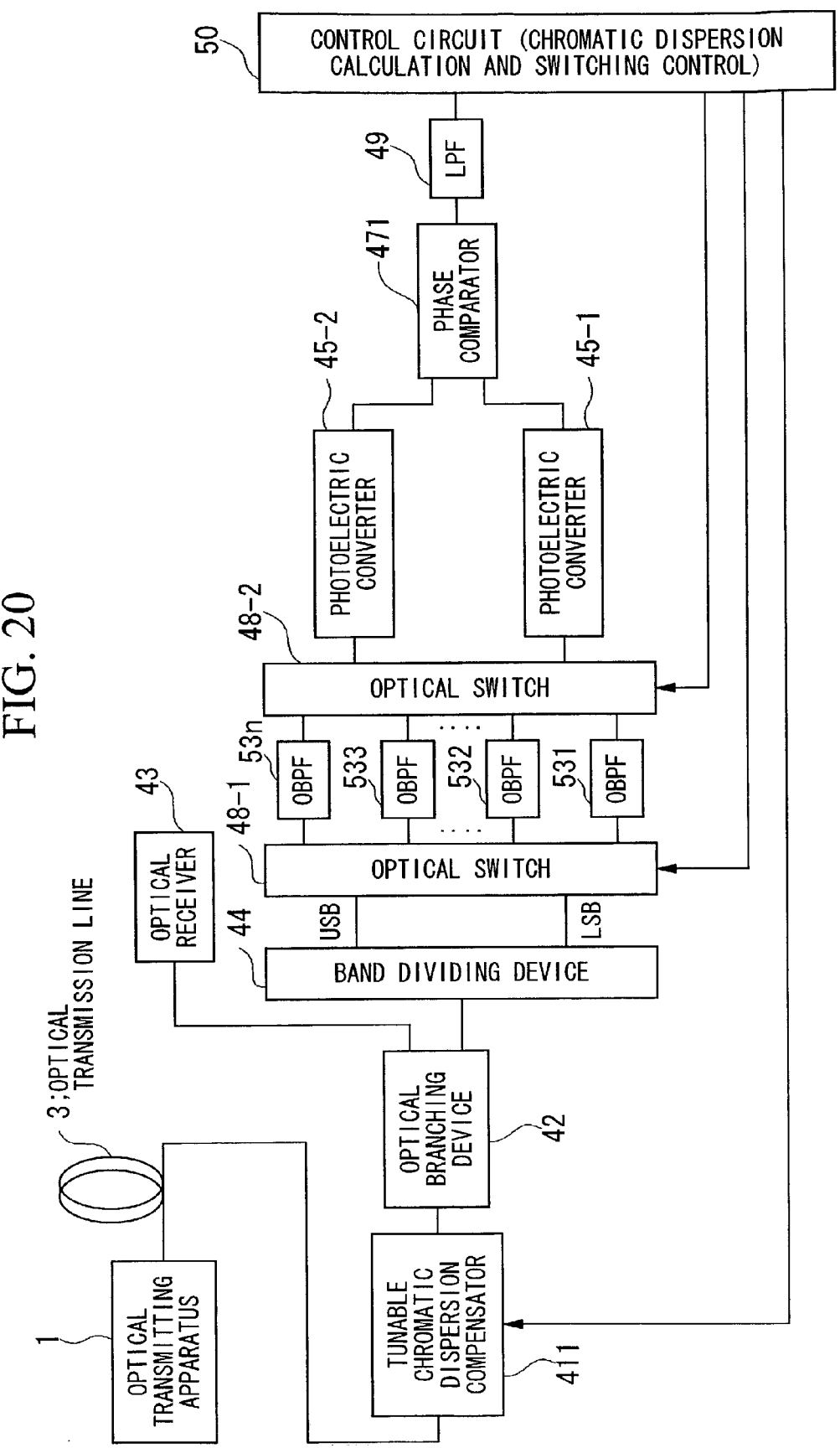
FIG. 20 is a block diagram showing a third structural example of the automatic dispersion compensating optical link system of the fourth embodiment.

Third Structural Example of the Automatic Dispersion Compensating Optical Link System of the Fourth Embodiment FIG. 20 shows a second structural example of the automatic dispersion compensating optical link system. In this structural example, the USB component and LSB component that have been divided by the band dividing device 44 are input, via an optical switch 48-1, into optical band bass filters (OBPF) 531 to 53n that extract optical bands having desired center wavelengths. The extracted optical bands are then input, via an optical switch 48-2, into the photoelectric converters 45-1 and 45-2 and are converted into two electrical signals. The phases of the two electrical signals thus obtained are then compared by the phase comparator 471, and the output from the phase comparator 471 then passes through an LPF 49 and is then output to the control circuit 50. The optical switches 48-1 and 48-2 mechanically switch the optical waveguide and may be formed by MEMS switches, acoustooptic (AO) switches, or thermo-optic (TO) switches.

By employing the above structure, it is possible for the photoelectric converters 45-1 and 45-2 and for the phase comparator 471 to be shared. In addition, the electrical components can be integrated and the apparatus can be reduced in size and made more stable.

Figure 21:
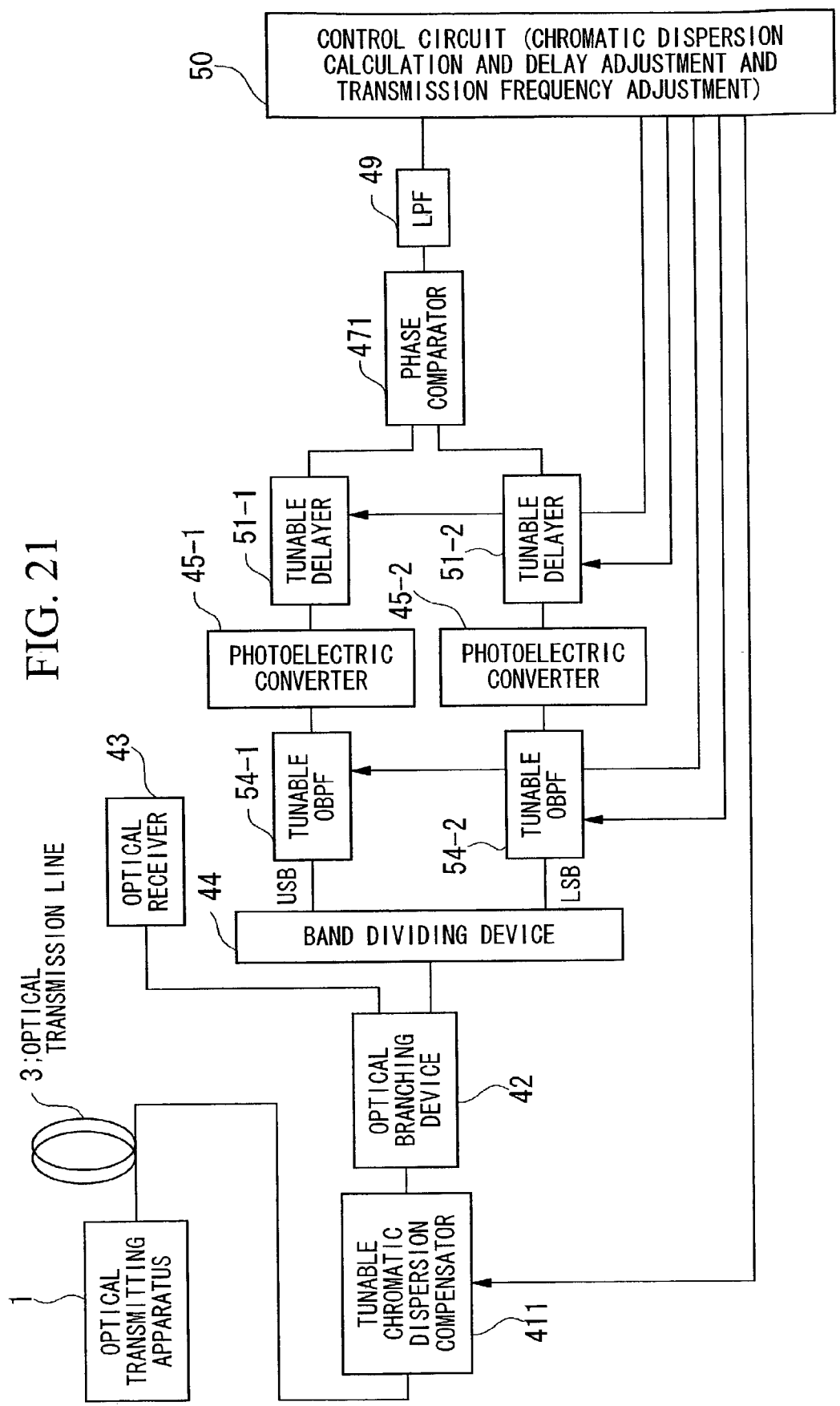
FIG. 21 is a block diagram showing a fourth structural example of the automatic dispersion compensating optical link system of the fourth embodiment.

Fourth Structural Example of the Automatic Dispersion Compensating Optical Link System of the Fourth Embodiment FIG. 21 shows a fourth structural example of the automatic dispersion compensating optical link system. In order to generate clock signals having the desired repetitive frequency, the present structural example is provided with tunable OBPF 54-1 and 54-2 that can be adjusted to the desired center frequency.

By employing the above structure, it is possible for the components to be shared, which allows the apparatus to be reduced in size and made more stable. In addition, it is possible to detect the chromatic dispersion value using the clock signals having arbitrary repetitive frequencies. Furthermore, for example, the method described in the fourth structural example of the automatic dispersion compensating optical link system of the third embodiment can be used to render the tunable delayers 51-1 and 51-2 unnecessary.

Next, the automatic dispersion compensating optical link system of the fifth embodiment will be described.

Figure 22:
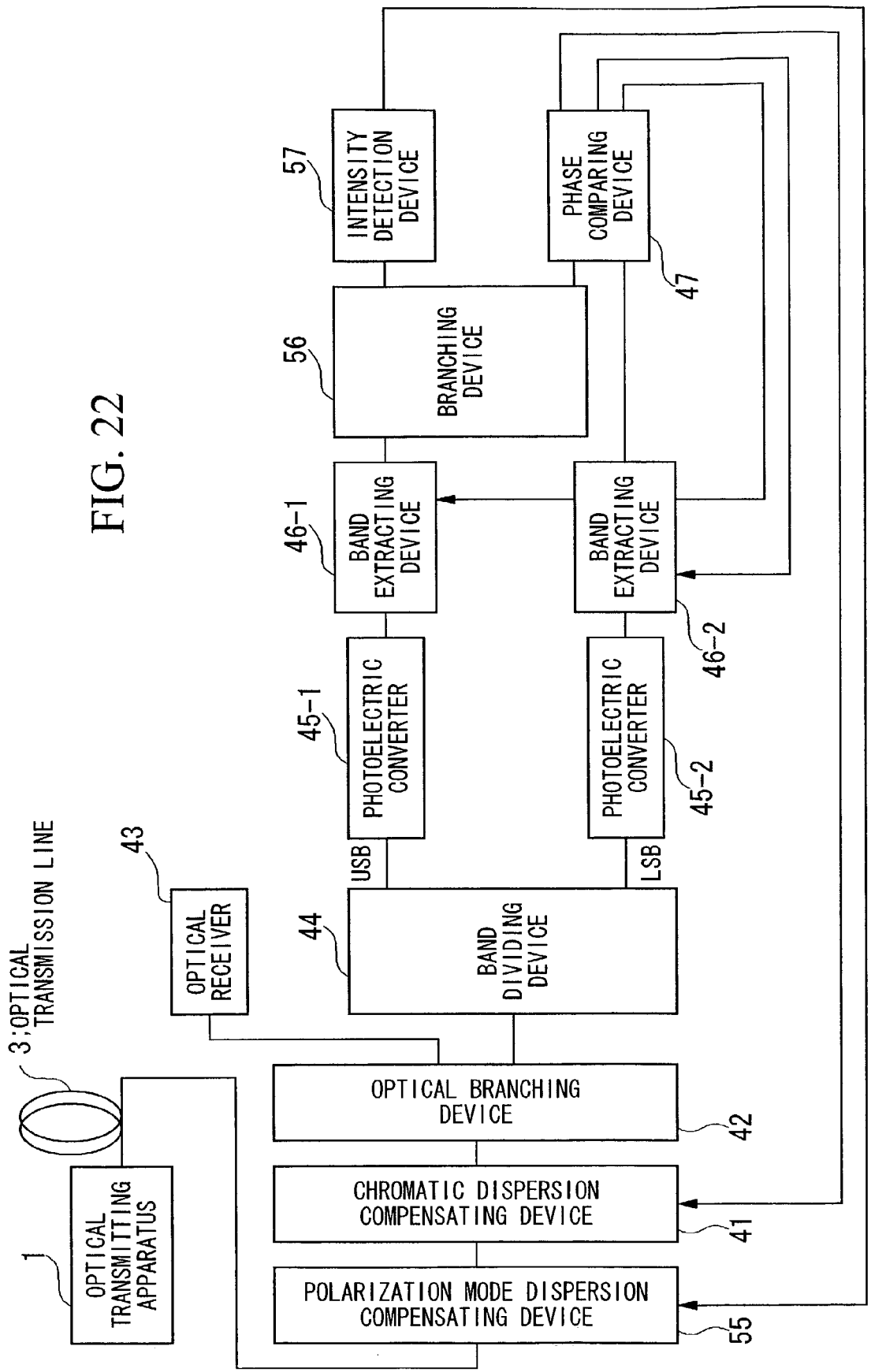
FIG. 22 is a block diagram showing a first structural example of the automatic dispersion compensating optical link system of the fifth embodiment.

First Structural Example of the Automatic Dispersion Compensating Optical Link System of the Fifth Embodiment FIG. 22 shows a first structural example of the automatic dispersion compensating optical link system. In the above described third and fourth embodiments, the chromatic dispersion is compensated by the detected relative phase difference in clock signals extracted from band divided USB and LSB components. The fifth embodiment differs in that polarization mode dispersion is compensated by monitoring the intensity of extracted clock signals. The optical transmitting apparatus 1 shown in FIG. 22 transmits carrier suppressed RZ encoded optical signals generated using carrier suppressing means and binary NRZ code or partial response code. Carrier suppressed RZ encoded optical signals transmitted via the optical transmission line 3 are branched by the optical branching device 42, and one branch is input into an optical receiver 43 while the other branch is input into a band dividing device 44. After the binary NRZ code or the partial response code has been extracted by the band dividing device 44, photoelectric conversion is performed by photoelectric converters 45-1 and 45-2 so that the respective components are converted into basebands. Next, bands having arbitrary center frequencies are extracted from the converted basebands, and the chromatic dispersion compensating device 41 is controlled so as to compensate the chromatic dispersion based on a chromatic dispersion value calculated from phase information. The intensity of at least one of the extracted bands is monitored by intensity detection device 57, and the polarization mode dispersion compensating device 55 is controlled so that the dispersion of the polarization mode is compensated such that this intensity is at maximum.

It is also possible for an optical amplifier to be disposed at either the transmission end or the receiving end of the optical transmission line 3 or else partway between the two so that sufficient optical power is obtained to ensure a sufficient SN ratio in the optical receiver.

Two optical band pass filters that respectively divide the USB and LSB components, a Mach-Zehnder interferometer type optical filter formed on an optical fiber or optical waveguide, or an arrayed waveguide grating can be used as the band dividing device 44. The phase comparing device 47 is structured so as to use a mixer that outputs a voltage that corresponds to the phase difference between two clock signals output from the band extracting devices 46-1 and 46-2, or is structured so as to determine the phase difference by performing waveform sampling via an A/D converter or the like. The chromatic dispersion compensating device 41 is structured so as to change a chromatic dispersion value on the basis of chromatic dispersion control information, and a structure that employs, for example, an AWG, a structure that employs virtually imaged phased array (VIPA), or a structure that employs a tunable fiber grating may be used for the chromatic dispersion compensating device 41. The intensity detection device 57 may be formed, for example, by an RF spectrum analyzer or by using an RF power meter. The polarization mode dispersion compensating device 55 is structured such that it can change the polarization mode dispersion value so that the intensity monitored by the intensity detection device 57 is at maximum. Such structures include, for example, a structure in which a fixed polarization mode dispersion value is applied and the power ratio of the two primary states of polarization (PSP) of the input signals is changed; and a structure in which, after the input signal has been split into orthogonal polarizations by a polarization beam splitter (PBS), and the delay in one polarization is optically or electrically changed.

According to the present structural example, in addition to it being possible to perform chromatic dispersion compensation, it is also possible to compensate polarization mode dispersion independently from the chromatic dispersion using clock signals detected in the chromatic dispersion compensation.

Figure 23:
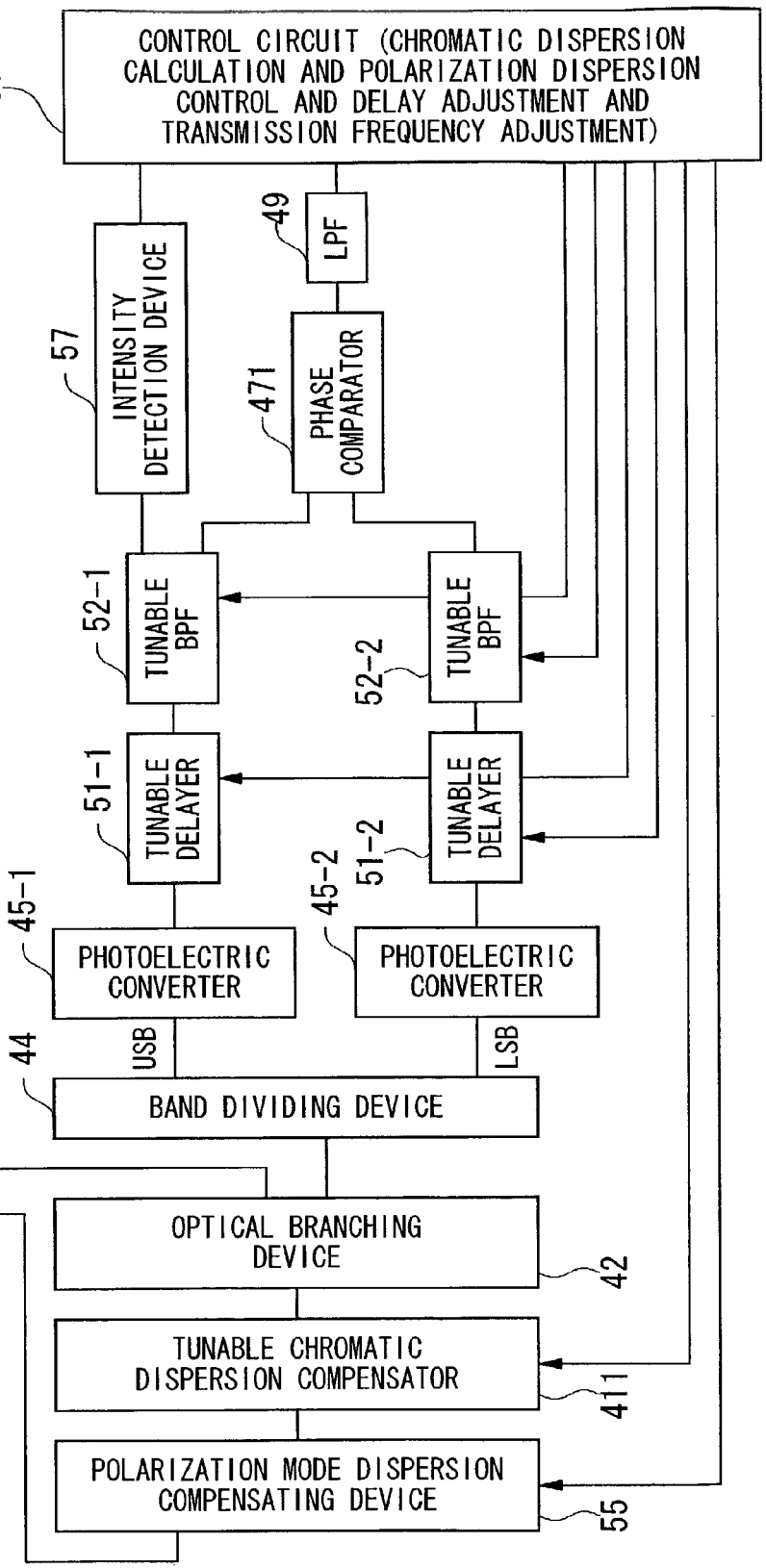
FIG. 23 is a block diagram showing a second structural example of the automatic dispersion compensating optical link system of the fifth embodiment.
Figure 27A:
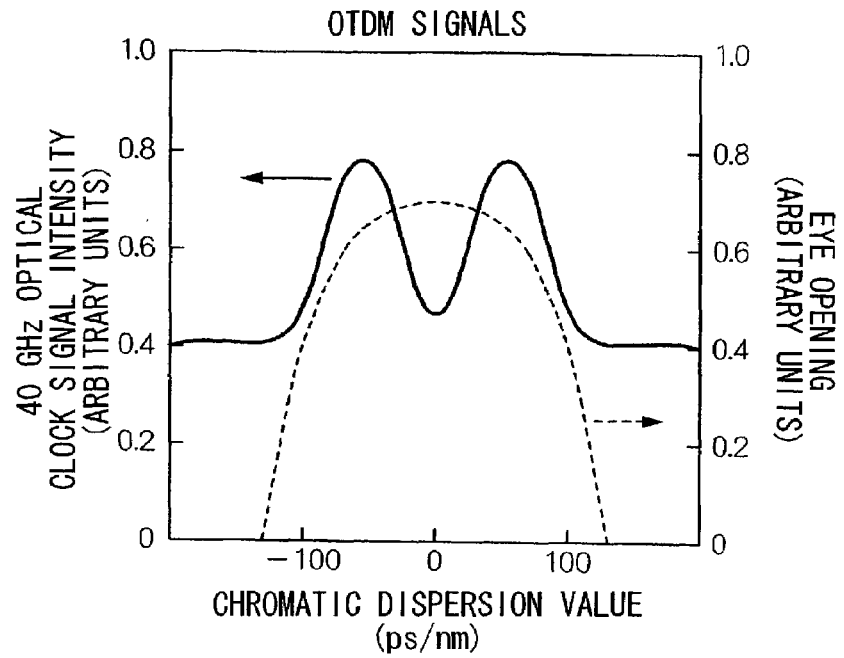
FIGS. 27A and 27B are diagrams showing a relationship between optical clock signal intensity and chromatic dispersion values.
Figure 27B:
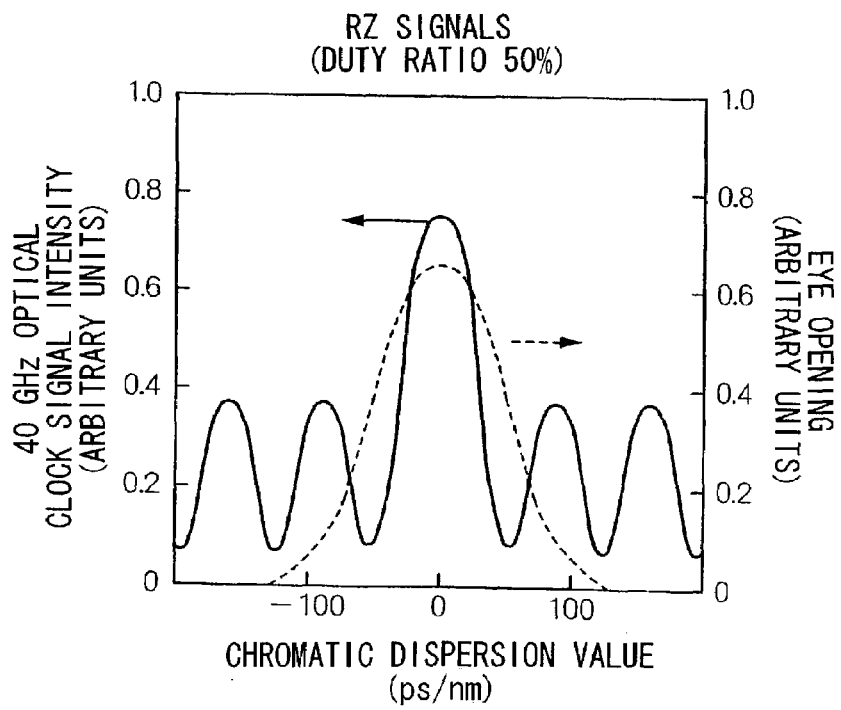

Second Structural Example of the Automatic Dispersion Compensating Optical Link System of the Fifth Embodiment FIG. 23 shows a second structural example of the automatic dispersion compensating optical link system. The structural example shown in FIG. 23 is basically the same as that shown in FIG. 17, however, the structural example of the fifth embodiment can be applied in all of the structural example described above.

An example of an algorithm for the chromatic dispersion and polarization mode dispersion compensation methods is shown below.

When the system is started up the relative phase difference in the clock signals is detected and the chromatic dispersion is compensated. After the chromatic dispersion has been compensated, the polarization mode dispersion is compensated such that the intensity of the clock signals is at maximum.

However, when the system is operating both the intensity and relative phase difference of the clock signals are monitored, and the chromatic dispersion is compensated when both of them change. When only the intensity changes the polarization mode dispersion is compensated. In this way, it is possible to compensate chromatic dispersion and polarization mode dispersion independently without affecting the transmitted signals even when the system is in operation.

Note that, in addition to the optical signals described in the first, second, and third embodiments, the automatic dispersion compensating optical link system of the present invention can also be used with various code formats such as DPSK format, QPSK format, Duobinary format, BPSK format, CRZ format, CS-RZ format, DCS-RZ format, RZ-DPSK format (T. Miyano et. al., Tech. Dig. In OECC 2000, paper 14D3-3, July 2000), and CS-RZ-DPSK format disclosed in Japanese Unexamined Patent Application, First Publication No. 2002-040855.

What is claimed is:

1. A method of measuring chromatic dispersion of an optical transmission line, comprising:

transmitting on the optical transmission line a single digital optical signal generated by using a single light source on an optical transmission line, the digital optical signal being a carrier suppressed RZ encoded optical signal generated using a carrier suppressing device and binary NRZ code or partial response code, a carrier suppressed clock signal generated using a carrier suppressing device and a clock signal, an NRZ encoded optical signal, an RZ encoded optical signal, or an optical clock signal;

receiving the same single digital optical signal transmitted on the optical transmission line;

optically separating at least two band components of different frequencies from the received same single digital optical signal;

extracting at least two pieces of phase information of basebands from the at least two band components;

comparing at least two of the at least two extracted pieces of phase information to obtain information about a relative phase difference between at least two of the at least two extracted band components; and calculating a chromatic dispersion value for the optical transmission line; based on the information about the relative phase difference extracted from the at least two band components of different frequency optically separated from the original transmitted single digital optical signal.

2. The high precision chromatic dispersion measuring method according to claim 1, wherein the digital optical signal is the carrier suppressed RZ encoded optical signal or the carrier suppressed clock signal, and wherein, in the chromatic dispersion value calculation step, the phase information is extracted from binary NRZ code components or partial response code components or clock signals in each of the two bands.

3. The high precision chromatic dispersion measuring method according to claim 1, wherein the digital optical signal is the carrier suppressed RZ encoded optical signal, or the carrier suppressed clock signal, wherein, in the digital optical signal receiving step, the carrier suppressed RZ encoded optical signal or of the carrier suppressed clock signal transmitted on the optical transmission line is directly received, and one of two bands included in the carrier suppressed RZ encoded optical signal or the carrier suppressed clock signal is separated and one band thus separated is received, and wherein, in the chromatic dispersion value calculation step, the phase information is extracted from binary RZ or NRZ code components or partial response code components or clock signals in each of two signals thus received, and a relative phase difference between the binary RZ or NRZ code components or the partial response code components or the clock signals in the two signals thus received is detected based on the phase information for each of the two signals.

4. The high precision chromatic dispersion measuring method according to claim 1, wherein the digital optical signal is the carrier suppressed RZ encoded optical signal or the carrier suppressed clock signal, wherein, in the digital optical signal receiving step, one of two bands of the carrier suppressed RZ encoded optical signal or of the carrier suppressed clock signal transmitted on the optical transmission line is received, and wherein, in the chromatic dispersion value calculation step, the phase information is extracted from binary NRZ code components or partial response code components or clock signals in one band thus received, and a relative phase difference between the extracted phase information and a phase state measured for a reference dispersion value in advance is detected.

5. The high precision chromatic dispersion measuring method according to claim 1, wherein the digital optical signal is the carrier suppressed RZ encoded optical signal or the carrier suppressed clock signal, wherein, in the digital optical signal receiving step, the carrier suppressed RZ encoded optical signal or of the carrier suppressed clock signal transmitted on the optical transmission line and one of two bands which is separated from the carrier suppressed RZ encoded optical signal or the carrier suppressed clock signal, the two bands being included in the carrier suppressed RZ encoded optical signal or the carrier suppressed clock signal, are sequentially received with a separation band of a tunable band optical filter switched, and wherein, in the chromatic dispersion value calculation step, the phase information is extracted from binary RZ or NRZ code components or partial response code components or clock signals in each of two signals thus received, and a relative phase difference between the binary RZ or NRZ code components or the partial response code components or the clock signals in the two signals thus received is detected based on the phase information for each of the two signals.

6. The high precision chromatic dispersion measuring method according to any of claims 2 to 5, wherein a continuous wave light is modulated with binary NRZ code or partial response code or clock signals, and the modulated signal is encoded to generate RZ code by adding an alternating phase difference by means of modulation using clock signals having a frequency of m/2 times the bit rate of the modulation signal (wherein m is a positive integer), and the carrier suppressed RZ encoded optical signal or the carrier suppressed clock signal is generated.

7. The high precision chromatic dispersion measuring method according to claim 6, wherein a tone signal is superposed on the continuous wave light or the modulation signal, and wherein, at the receiving side, two bands of the carrier suppressed RZ encoded optical signal or of the carrier suppressed clock signal are separated and are received, and a relative phase difference is detected by separating out the tone signals in each of the bands, and a chromatic dispersion value for the optical transmission line is calculated from the relative phase difference.

8. The high precision chromatic dispersion measuring method according to claim 6, wherein a tone signal is superposed on the continuous wave light or the modulation signal, and wherein, at the receiving side, both of the two bands and one of the two bands of the carrier suppressed RZ encoded optical signal or of the carrier suppressed clock signal are separated and are received, and a relative phase difference is detected by separating out the tone signals in each of the bands, and a chromatic dispersion value for the optical transmission line is calculated from the relative phase difference.

9. The high precision chromatic dispersion measuring method according to claim 6,
wherein a tone signal is superposed on the continuous wave light or the modulation signal, and
wherein, at the receiving side, one of the two bands of the carrier suppressed RZ encoded optical signal or of the carrier suppressed clock signal is received, and phase information is extracted by separating out the tone signals in the band, and a relative phase difference is detected between the phase information and a phase state measured for a reference dispersion value in advance, and a chromatic dispersion value for the optical transmission line is calculated from, the relative phase difference.

10. The high precision chromatic dispersion measuring method according to claim 6,
wherein a tone signal is superposed on the continuous wave light or the modulation signal, and
wherein, at the receiving side, both of the two bands and one of the two bands of the carrier suppressed RZ encoded optical signal or of the carrier suppressed clock signal are sequentially received with separation band of a tunable band optical filter switched, and a relative phase difference is detected by separating out the tone signals in each of the bands, and a chromatic dispersion value for the optical transmission line is calculated from the relative phase difference.

11. The high precision chromatic dispersion measuring method according to any of claims 2 to 5, wherein carrier suppressed clock signals are generated by modulating continuous wave light using clock signals having a frequency of m/2 times the bit rate of a modulation signal (wherein m is a positive integer), and these carrier suppressed clock signals are modulated as the modulation signals with binary NRZ code, partial response code, or clock signals, and the carrier suppressed RZ encoded optical signal or the carrier suppressed clock signal is thereby generated.

12. The high precision chromatic dispersion measuring method according to claim 11,
wherein a tone signal is superposed on the continuous wave light or the modulation signal, and
wherein, at the receiving side, two bands of the carrier suppressed RZ encoded optical signal or of the carrier suppressed clock signal are separated and are received, and a relative phase difference is detected by separating out the tone signals in each of the bands, and a chromatic dispersion value for the optical transmission line is calculated from the relative phase difference.

13. The high precision chromatic dispersion measuring method according to claim 11,
wherein a tone signal is superposed on the continuous wave light or the modulation signal, and
wherein, at the receiving side, both of the two bands and one of the two bands of the carrier suppressed RZ encoded optical signal or of the carrier suppressed clock signal are separated and are received, and a relative phase difference is detected by separating out the tone signals in each of the bands, and a chromatic dispersion value for the optical transmission line is calculated from the relative phase difference.

14. The high precision chromatic dispersion measuring method according to claim 11,
wherein a tone signal is superposed on the continuous wave light or the modulation signal, and
wherein, at the receiving side, one of the two bands of the carrier suppressed RZ encoded optical signal or of the carrier suppressed clock signal is received, and phase information is extracted by separating out the tone signals in the band, and a relative phase difference is detected between the phase information and a phase state measured for a reference dispersion value in advance, and a chromatic dispersion value for the optical transmission line is calculated from that relative phase difference.

15. The high precision chromatic dispersion measuring method according to claim 11,
wherein a tone signal is superposed on the continuous wave light or the modulation signal, and
wherein, at the receiving side, both of the two bands and one of the two bands of the carrier suppressed RZ encoded optical signal or of the carrier suppressed clock signal are sequentially received with separation band of a tunable band optical filter switched, and a relative phase difference is detected by separating out the tone signals in each of the bands, and a chromatic dispersion value for the optical transmission line is calculated from the relative phase difference.

16. The high precision chromatic dispersion measuring method according to claim 1,
wherein the digital optical signal is the NRZ encoded optical signal, the RZ encoded optical signal, or the optical clock signal,
wherein, in the digital optical signal receiving step, two vestigial side bands (VSB) of the NRZ encoded optical signal, the RZ encoded optical signal or the optical clock signal transmitted on the optical transmission line are separated and are received, and
wherein, in the chromatic dispersion value calculation step, the phase information is extracted from NRZ components or clock components in each of the two VSB bands and a relative phase difference between the two VSB bands is detected.

17. The high precision chromatic dispersion measuring method according to claim 1,
wherein the digital optical signal is the NRZ encoded optical signal, the RZ encoded optical signal or the optical clock signal,
wherein, in the digital optical signal receiving step, the NRZ encoded optical signal, the RZ encoded optical signal or the optical clock signal transmitted on the optical transmission line is directly received, and one of two VSB bands included in the NRZ encoded optical signal, the RZ encoded optical signal or the optical clock signal is separated and one VSB band thus separated is received, and
wherein, in the chromatic dispersion value calculation step, the phase information is extracted from NRZ components or clock components in each of two signals thus received, and a relative phase difference between the NRZ components or the clock components in the two signals thus received is detected based on the phase information for each of the two signals.

18. The high precision chromatic dispersion measuring method according to claim 1,
wherein the digital optical signal is the NRZ encoded optical signal, the RZ encoded optical signal or the optical clock signal,
wherein, in the digital optical signal receiving step, one of two VSB bands of the NRZ encoded optical signal, the RZ encoded optical signal or the optical clock signal transmitted on the optical transmission line is received, and
wherein, in the chromatic dispersion value calculation step, the phase information is extracted from NRZ components or clock components in one VSB band thus received, and a relative phase difference between the extracted phase information and a phase state measured for a reference dispersion value in advance is detected.

19. The high precision chromatic dispersion measuring method according to claim 1,
wherein the digital optical signal is the NRZ encoded optical signal, the RZ encoded optical signal or the optical clock signal,
wherein, in the digital optical signal receiving step, the NRZ encoded optical signal, the RZ encoded optical signal or the optical clock signal transmitted on the optical transmission line and one of two VSB bands which is separated from the NRZ encoded optical signal, the RZ encoded optical signal or the optical clock signal, the two VSB bands being included in the NRZ encoded optical signal, the RZ encoded optical signal or the optical clock signal are sequentially received with a separation band of a tunable band optical filter switched, and
wherein, in the chromatic dispersion value calculation step, the phase information is extracted from NRZ components or clock components in each of two signals thus received, and a relative phase difference between the NRZ components or the clock components in the two signals thus received is detected based on the phase information for each of the two signals.

20. An automatic dispersion compensating optical link system comprising:
an optical signal transmission device that transmits a single digital optical signal generated by using a single light source on an optical transmission line which connects an optical transmitting apparatus and an optical receiving apparatus with the digital signal being a carrier suppressed RZ encoded optical signal generated using a carrier suppressing device and binary NRZ code or partial response code, a carrier suppressed clock signal generated using a carrier suppressing device and a clock signal, an NRZ encoded optical signal, an RZ encoded optical signal, or an optical clock signal;
an optical signal receiving device that receives the same single digital optical signal transmitted on the optical transmission line, and optically separates at least two band components of different frequency from the received same single digital optical signal; and
a chromatic dispersion value calculation device that extracts at least two pieces of phase information of basebands from the at least two band components, and compares at least two of the at least two extracted pieces of phase information to obtain information about a relative phase difference between at least two of the at least two extracted band components, and calculates a chromatic dispersion value for the optical transmission line, based on the information about the relative phase difference extracted from the at least two band components of different frequency optically separated from the original transmitted single digital optical signal.

21. The automatic dispersion compensating optical link system according to claim 20, the automatic dispersion compensating optical link system further comprises a dispersion compensating device which performs dispersion compensation in any of the optical transmitting apparatus, the optical receiving apparatus, and the optical transmission line based on a chromatic dispersion value for the optical transmission line calculated by the chromatic dispersion value calculation device.

22. The automatic dispersion compensating optical link system according to claim 20,
wherein the optical transmitting apparatus and the optical receiving apparatus are respectively formed by wavelength-division multiplexing transmitting apparatus and wavelength-division multiplexing receiving apparatus, and
wherein the chromatic dispersion value calculation device calculates the chromatic dispersion value of at least one wavelength channel.

23. The automatic dispersion compensating optical link system according to claim 22, wherein the automatic dispersion compensating optical link system further comprises a dispersion compensating device that performs dispersion compensation based on a calculated chromatic dispersion value for the optical transmission line.

24. The automatic dispersion compensating optical link system according to claim 23, wherein the chromatic dispersion value calculation device further comprises an optical switch capable, of switching a plurality of wavelength channels.

25. The automatic dispersion compensating optical link system according to claim 22, wherein the chromatic dispersion value calculation device further comprises an optical switch capable of switching a plurality of wavelength channels, and the chromatic dispersion value calculation device is shared between a plurality of wavelength channels.

26. The automatic dispersion compensating optical link system according to claim 20, wherein
the optical transmitting apparatus generates the carrier suppressed RZ encoded optical signal, and wherein
the optical receiving apparatus comprises:
a chromatic dispersion compensating device that performs chromatic dispersion compensation by changing a chromatic dispersion amount;
a photoelectric conversion device that converts optical signals of each of the separated bands into electrical signals;
a band extracting device that extracts a band having an arbitrary center frequency from baseband signals output from the photoelectric conversion device; and
a phase comparing device that extracts and compares phase information of bands having the same center baseband frequencies extracted from the optical signals of the respective bands.

27. The automatic dispersion compensating optical link system according to claim 26, wherein the automatic dispersion compensating optical link system is further comprises a polarization dispersion compensating device that performs polarization dispersion compensation; and an intensity measuring device which measures an intensity in at least one of the band or the optical band extracted from the separated bands.

28. The automatic. dispersion compensating optical link system according to claim 20, wherein
the optical transmitting apparatus generates a CARRIER suppressed RZ encoded optical signal, and wherein
the optical receiving apparatus comprises:
a chromatic dispersion compensating device that performs chromatic dispersion compensation by changing a chromatic dispersion amount;
an optical band extracting device that extracts an optical band having an arbitrary center frequency from the respective separated bands;
a photoelectric conversion device that converts optical bands extracted from the respective bands into electrical signals; and a phase comparing device that extracts and compares phase information from baseband signals extracted from the photoelectric conversion device.

29. The automatic dispersion compensating optical link system according to claim 28, wherein the automatic dispersion compensating optical link system is further comprises a polarization dispersion compensating device that performs polarization dispersion compensation; and an intensity measuring device which measures an intensity in at least one of the band or the optical band extracted from the separated bands.

30. The automatic dispersion compensating optical link system according to claim 20,
wherein the optical signal transmission device transmits, as the digital optical signal, the carrier suppressed RZ encoded optical signal or the carrier suppressed clock signal, and
wherein the chromatic dispersion value calculation device extracts the phase information from binary NRZ code components or partial response code components or clock signals in each of the two bands.

31. The automatic dispersion compensating optical link system according to claim 20,
wherein the optical signal transmission device transmits, as the digital optical signal, the carrier suppressed RZ encoded optical signal or the carrier suppressed clock signal,
wherein the optical signal receiving device directly receives the carrier suppressed RZ encoded optical signal or the carrier suppressed clock signal transmitted on the optical transmission line, and separates one of two bands included in the carrier suppressed RZ encoded optical signal or the carrier suppressed clock signal and receives one band thus separated, and
wherein the chromatic dispersion value calculation device extracts the phase information from binary RZ or NRZ code components or partial response code components or clock signals in each of two signals thus received, and detects a relative phase difference between the binary RZ or NRZ code components or the partial response code components or the clock signals in the two signals thus received based on the phase information for each of the two signals.

32. The automatic dispersion compensating optical link system according to claim 20,
wherein the optical signal transmission device transmits, as the digital optical signal, the carrier suppressed RZ encoded optical signal or the carrier suppressed clock,
wherein the optical signal receiving device receives one of two bands of the carrier suppressed RZ encoded optical signal or of the carrier suppressed clock signal transmitted on the optical transmission line, and
wherein the chromatic dispersion value calculation device extracts the phase information from binary NRZ code components or partial response code components or clock signals in one band thus received and detects a relative phase difference between the extracted phase information and a phase state measured for a reference dispersion value in advance.

33. The automatic dispersion compensating optical link system according to claim 20,
wherein the optical signal transmission device transmits, as the digital optical signal, the carrier suppressed RZ encoded optical signal or the carrier suppressed clock signal,
wherein the optical signal receiving device sequentially receives the carrier suppressed RZ encoded optical signal or the carrier suppressed clock signal transmitted on the optical transmission line and one of two bands which is separated from the carrier suppressed RZ encoded optical signal or the carrier suppressed clock signal, the two bands being included in the carrier suppressed RZ encoded optical signal or the carrier suppressed clock signal, with a separation band of a tunable band optical filter switched, and
wherein the chromatic dispersion value calculation device extracts the phase information from binary RZ or NRZ code components or partial response code components or a clock signal in each of two signals thus received, and detects a relative phase difference between the binary RZ or NRZ code components or the partial response code components or the clock signal in the two signals thus received based on the phase information for each of the two signals.

34. The automatic dispersion compensating optical link system according to claim 20,
wherein the optical signal transmission device transmits, as the digital optical signal, the NRZ encoded optical signal, the RZ encoded optical signal or the optical clock signal,
wherein the optical signal receiving device separates two vestigial side bands (VSB) of the NRZ encoded optical signal, the RZ encoded optical signal or the optical clock signal transmitted on the optical transmission line into bands and receives the separated bands, and
wherein the chromatic dispersion value calculation device extracts the phase information from NRZ components or clock components in each of the two VSB bands and detects a relative phase difference between the two VSB bands.

35. The automatic dispersion compensating optical link system according to claim 20,
wherein the optical signal transmission device transmits, as the digital optical signal, the NRZ encoded optical signal, the RZ encoded optical signal or the optical clock signal,
wherein the optical signal receiving device directly receives the NRZ encoded optical signal, the RZ encoded optical signal or the optical clock signal transmitted on the optical transmission line and separates one of two VSB bands included in the NRZ encoded optical signal, the RZ encoded optical signal or the optical clock signal and receives one VSB band thus separated, and
wherein the chromatic dispersion value calculation device extracts the phase information from NRZ components or clock components in each of two signals thus received, and detects a relative phase difference between the NRZ components or the clock components in the two signals thus received based on the phase information for each of the two signals.

36. The automatic dispersion compensating optical link system according to claim 20,
wherein the optical signal transmission device transmits, as the digital optical signal, the NRZ encoded optical signal, the RZ encoded optical signal or the optical clock signal,
wherein the optical signal receiving device receives one of two VSB bands of the NRZ encoded optical signal, the RZ encoded optical signal or the optical clock signal transmitted on the optical transmission line, and
wherein the chromatic dispersion value calculation device extracts the phase information from NRZ components or clock components in one VSB band thus received, and detects a relative phase difference between the extracted phase information and a phase state measured for a reference dispersion value in advance.

37. The automatic dispersion compensating optical link system according to claim 20, wherein the optical signal transmission device transmits, as the digital optical signal, the NRZ encoded optical signal, the RZ encoded optical signal or the optical clock signal, wherein the optical signal receiving device sequentially receives the NRZ encoded optical signal, the RZ encoded optical signal or the optical clock signal transmitted on the optical transmission line and one to two VSB bands which is separated from the NRZ encoded optical signal, the RZ encoded optical signal or the optical clock signal, the two VSB bands being included in the NRZ encoded optical signal, the RZ encoded optical signal or the optical clock signal, with a separation band of a tunable band optical filter switched, and wherein the chromatic dispersion value calculation device extracts the phase information from NRZ components or clock components in each of two signals thus received, and detects a relative phase difference between the NRZ components or the clock components in the two signals thus received based on the phase information for each of the two signals.

38. An optical receiving apparatus comprising:

a device which receives a single digital optical signal, which is a carrier suppressed RZ encoded optical signal generated using a carrier suppressing device and binary NRZ code or partial response code, a carrier suppressed clock signal generated using a carrier suppressing device and a clock signal, an NRZ encoded optical signal, an RZ encoded optical signal, or an optical clock signal, and which single digital optical signal is generated by using a single light source and which is transmitted on an optical transmission line, optically separates at least two optical spectrum components from the received same single digital optical signal, extracts at least two components of different frequency from among the optical spectrum components and extracts at least two pieces of phase information of basebands from the at least two components of different frequencies;

a phase comparing device which detects a relative phase difference between the extracted frequency components based on the phase information for each of the frequency components;

a chromatic dispersion measuring device which calculates a chromatic dispersion amount of the digital optical signal due to the optical transmission line based on the relative phase difference obtained from the phase comparing device; and a dispersion compensating device which compensates chromatic dispersion of the optical transmission line based on a measurement result of the chromatic dispersion measuring device.

39. The optical receiving apparatus according to claim 38, wherein the optical receiving apparatus further comprises a polarization mode dispersion compensating device.

* * * * *